(12) United States Patent
Kashihara et al.

(10) Patent No.: US 6,735,364 B2
(45) Date of Patent: May 11, 2004

(54) ARRAYED WAVEGUIDE GRATING OPTICAL MULTIPLEXER/DEMULTIPLEXER AND METHOD FOR MANUFACTURING THE SAME

(75) Inventors: Kazuhisa Kashihara, Tokyo (JP); Kazutaka Nara, Tokyo (JP); Kanji Tanaka, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 23 days.

(21) Appl. No.: 10/159,101
(22) Filed: Jun. 3, 2002
(65) Prior Publication Data US 2003/0039441 A1 Feb. 27, 2003

(30) Foreign Application Priority Data

Aug. 27, 2001 (JP) ........................................ 2001-256343

(51) Int. Cl.$^7$ .............................. G02B 6/34; H04J 14/02
(52) U.S. Cl. ............................ 385/37; 385/14; 385/31; 385/129; 385/130; 398/79; 398/82; 398/84
(58) Field of Search .............................. 385/14, 31, 37, 385/129, 130, 131; 398/79, 82, 84

(56) References Cited

U.S. PATENT DOCUMENTS

| | | | |
|---|---|---|---|
| 6,222,963 B1 | 4/2001 | Grand et al. | 385/39 |
| 6,456,763 B2 * | 9/2002 | Kashihara et al. | 385/37 |
| 6,563,986 B2 * | 5/2003 | Kashihara et al. | 385/37 |

OTHER PUBLICATIONS

U.S. patent application Ser. No. 09/667,563, filed Sep. 22, 2000, allowed.
U.S. patent application Ser. No. 09/828,827, filed Apr. 10, 2001, allowed.
U.S. patent application Ser. No. 09/818,592, filed Mar. 28, 2001, pending.
U.S. patent application Ser. No. 09/817,067, filed Mar. 27, 2001, pending.
U.S. patent application Ser. No. 09/836,354, filed Apr. 18, 2001, pending.
U.S. patent application Ser. No. 09/904,847, filed Jul 16, 2001, pending.
U.S. patent application Ser. No. 10/026,722, filed Dec. 27, 2001, pending.
U.S. patent application Ser. No. 09/986,029, filed Nov. 7, 2001, pending.
U.S. patent application Ser. No. 10/020,220, filed Dec. 18, 2001, pending.
U.S. patent application Ser. No. 10/058,085, filed Jan. 29, 2002, pending.
U.S. patent application Ser. No.10/159,101, filed Jun. 3, 2002, pending.
U.S. patent application Ser. No. 10/127,406, filed Apr. 23, 2002, pending.
U.S. patent application Ser. No. 10/159,101, Kashihara et al., filed Jun. 3, 2002.
U.S. patent application Ser. No. 10/347,370, Nara et al., filed Jan. 21, 2003.

* cited by examiner

*Primary Examiner*—Edward J. Glick
*Assistant Examiner*—Therese Barber
(74) *Attorney, Agent, or Firm*—Oblon, Spivak, McClelland, Maier & Neustadt, P.C.

(57) ABSTRACT

An arrayed waveguide grating optical multiplexer/demultiplexer includes first and second slab waveguides. At least one of the first and a second slab waveguides includes first and second portions which are separated along an intersecting face intersecting an optical path in the first or second slab waveguides. A slider is fixed at a temperature shifted from a predetermined temperature to compensate a center wavelength difference between a target center wavelength of optical transmission of the arrayed waveguide grating optical multiplexer/demultiplexer at the predetermined temperature and the measured center wavelength of optical transmission of the arrayed waveguide grating optical multiplexer/demultiplexer at the predetermined temperature. The slider is configured to cause a relative motion between the first and second portions along the intersecting face according to a temperature change.

50 Claims, 15 Drawing Sheets

Fig. 11(a)
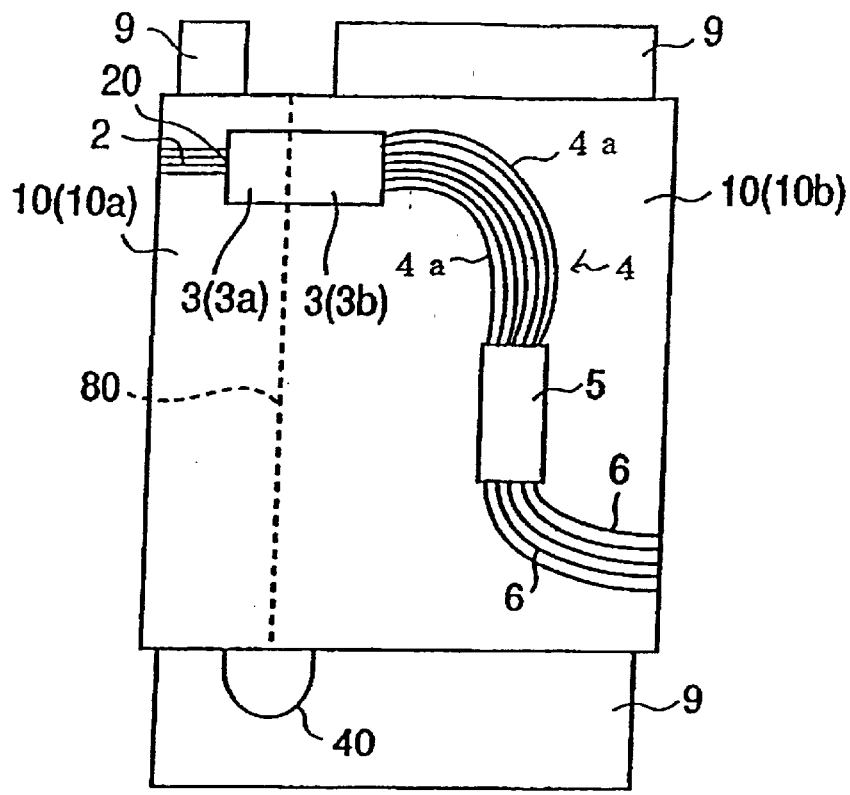
Fig. 11(b)
Fig. 11(c)
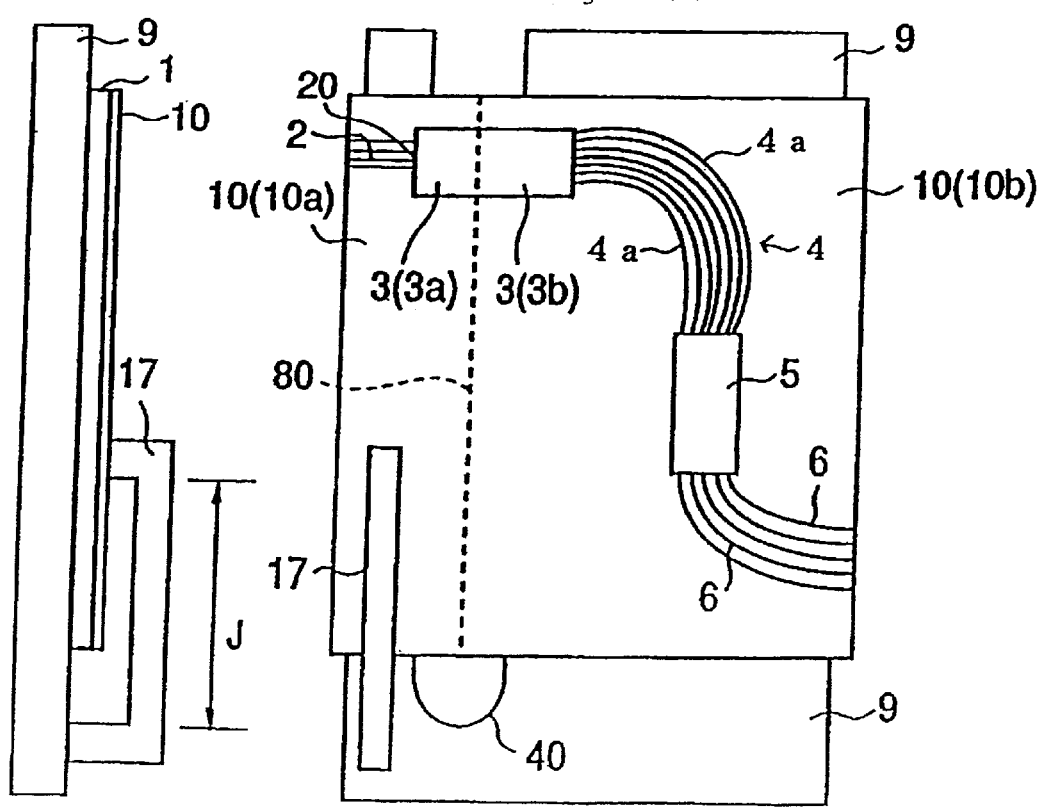

Fig. 15

|  | TEMPERATURE | SHIFT AMOUNT OF CENTER WAVELENGTH |
|---|---|---|
| 1 | 50.5 | 0.3077 |
| 2 | 45.0 | 0.2584 |
| 3 | 82.1 | 0.6683 |
| 4 | 78.3 | 0.6339 |
| 5 | 32.6 | 0.1010 |
| 6 | 58.8 | 0.4112 |
| 7 | 65.0 | 0.4501 |
| 8 | 62.2 | 0.4376 |
| 9 | 77.3 | 0.5939 |
| 10 | 41.2 | 0.1824 |

ARRAYED WAVEGUIDE GRATING OPTICAL MULTIPLEXER/DEMULTIPLEXER AND METHOD FOR MANUFACTURING THE SAME

CROSS-REFERENCE TO RELATED APPLICATIONS

The present application claims priority to Japanese Patent Application No. 2001-256343, filed Aug. 27, 2001. The contents of that application are incorporated herein by reference in their entirety.

BACKGROUND OF THE INVENTION

1. Field of the Invention

The present invention relates to an arrayed waveguide grating optical multiplexer/demultiplexer and a method for manufacturing the same.

2. Discussion of the Background

Recently, in optical communications, research and development of the optical wavelength division multiplexing transmission has been conducted actively for the way to dramatically increase the transmission capacity thereof, and practical applications have been proceeding. The optical wavelength division multiplexing transmission is that a plurality of lights having a wavelength different from each other are multiplexed and are transmitted, for example. In order to demultiplex the multiplexed light on the receiving side, such optical wavelength division multiplexing transmission systems need optical components which transmit lights having only predetermined wavelengths.

As one example of such optical components, an arrayed waveguide grating (AWG) which is shown in FIG. 12 is known. Referring to FIG. 12, generally, the arrayed waveguide grating is formed as a planar lightwave circuit (PLC) chip. This construction is hereinafter referred to as an arrayed waveguide grating.

Referring to FIG. 12, the arrayed waveguide grating is manufactured by forming a waveguide forming region 10 made from silica-based glass on a substrate made from silicon. The arrayed waveguide grating has at least one optical input waveguide 2 provided side by side, a first slab waveguide 3 connected to the outgoing side of the optical input waveguides 2, an arrayed waveguide 4 including a plurality of channel waveguides (4a) which are connected to the outgoing side of the first slab waveguide 3, a second slab waveguide 5 connected to the outgoing side of the arrayed waveguide 4, and a plurality of optical output waveguides 6 connected to the outgoing side of the second slab waveguide 5. The length of adjacent channel waveguides (4a) are different from each other by a predetermined length difference (ΔL).

The arrayed waveguide grating is designed and manufactured to have a center wavelength of optical transmission which is equal to a target center wavelength at a predetermined temperature. However, the arrayed waveguide gratings have different center wavelengths of optical transmission and the yield of the arrayed waveguide gratings deteriorates because refractive index, width and thickness of the core vary during manufacturing process.

SUMMARY OF THE INVENTION

According to one aspect of the present invention, an arrayed waveguide grating optical multiplexer/demultiplexer includes at least one first optical waveguide, a first slab waveguide, an arrayed waveguide connected to the at least one first optical waveguide via the first slab waveguide, a second slab waveguide, and a plurality of second optical waveguides connected to the arrayed waveguide via the second slab waveguide. The first slab waveguide includes first and second portions which are divided along an intersecting face intersecting an optical path in the first slab waveguide. A slider is fixed at a temperature shifted from a predetermined temperature to compensate a center wavelength difference between a target center wavelength of optical transmission of the arrayed waveguide grating optical multiplexer/demultiplexer at the predetermined temperature and the measured center wavelength of optical transmission of the arrayed waveguide grating optical multiplexer/demultiplexer at the predetermined temperature before the first slab waveguide is divided to the first and second portions, the slider being configured to cause a relative motion between the first and second portions of the first slab waveguide along the intersecting face according to a temperature change.

According to another aspect of the present invention, a method for manufacturing an arrayed waveguide grating optical multiplexer/demultiplexer includes providing an arrayed waveguide grating including at least one first optical waveguide, a first slab waveguide, an arrayed waveguide connected to the at least one first optical waveguide via the first slab waveguide, a second slab waveguide, and a plurality of second optical waveguides connected to the arrayed waveguide via the second slab waveguide. A measured center wavelength of optical transmission of the arrayed waveguide grating is measured at a predetermined temperature. A center wavelength difference between a target center wavelength of optical transmission of the arrayed waveguide grating at the predetermined temperature and the measured center wavelength is found. At least one of the first and second slab waveguides are divided to first and second portions along an intersecting face intersecting an optical path in the at least one of the first and second slab waveguides. A slider is fixed at a temperature shifted from the predetermined temperature to compensate the center wavelength difference such that the slider causes a relative motion between the first and second portions along the intersecting face according to a temperature change.

According to yet another aspect of the present invention, an arrayed waveguide grating optical multiplexer/demultiplexer includes at least one first optical waveguide, a first slab waveguide, an arrayed waveguide connected to the at least one first optical waveguide via the first slab waveguide, a second slab waveguide, a plurality of second optical waveguides connected to the arrayed waveguide via the second slab waveguide. The second slab waveguide includes first and second portions which are divided along an intersecting face intersecting an optical path in the second slab waveguide. A slider is fixed at a temperature shifted from a predetermined temperature to compensate a center wavelength difference between a target center wavelength of optical transmission of the arrayed waveguide grating optical multiplexer/demultiplexer at the predetermined temperature and the measured center wavelength of optical transmission of the arrayed waveguide grating optical multiplexer/demultiplexer at the predetermined temperature before the second slab waveguide is divided to the first and second portions. The slider is configured to cause a relative motion between the first and second portions of the second slab waveguide along the intersecting face according to a temperature change.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 11(a) is a top plan view illustrating a step of an exemplary method for manufacturing the arrayed waveguide grating optical multiplexer/demultiplexer shown in FIGS. 10(a) and 10(b);

FIG. 11(b) is a side view illustrating another step of the method shown in FIG. 11(a);

FIG. 11(c) is a top plan view illustrating the step illustrated in FIG. 11(b);

FIGS. 15 and 16 show a relationship between a temperature at which the slider was fixed and each shift amount of the center wavelength of optical transmission.

DESCRIPTION OF THE EMBODIMENTS

Figure 1B:
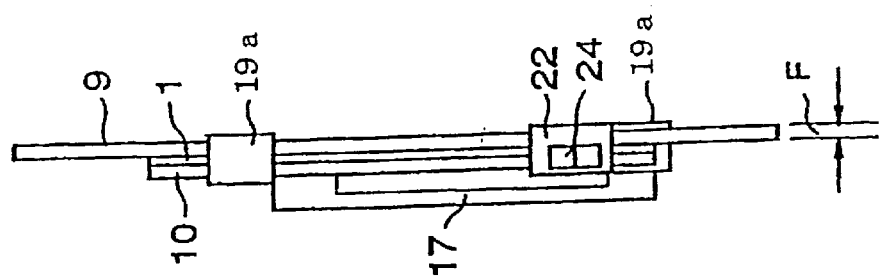
FIG. 1(b) is a side view of the arrayed waveguide grating optical multiplexer/demultiplexer shown in FIG. 1(a)

The embodiments will now be described with reference to the accompanying drawings, wherein like reference numerals designate corresponding or identical elements throughout the various drawings.

Figure 1A:
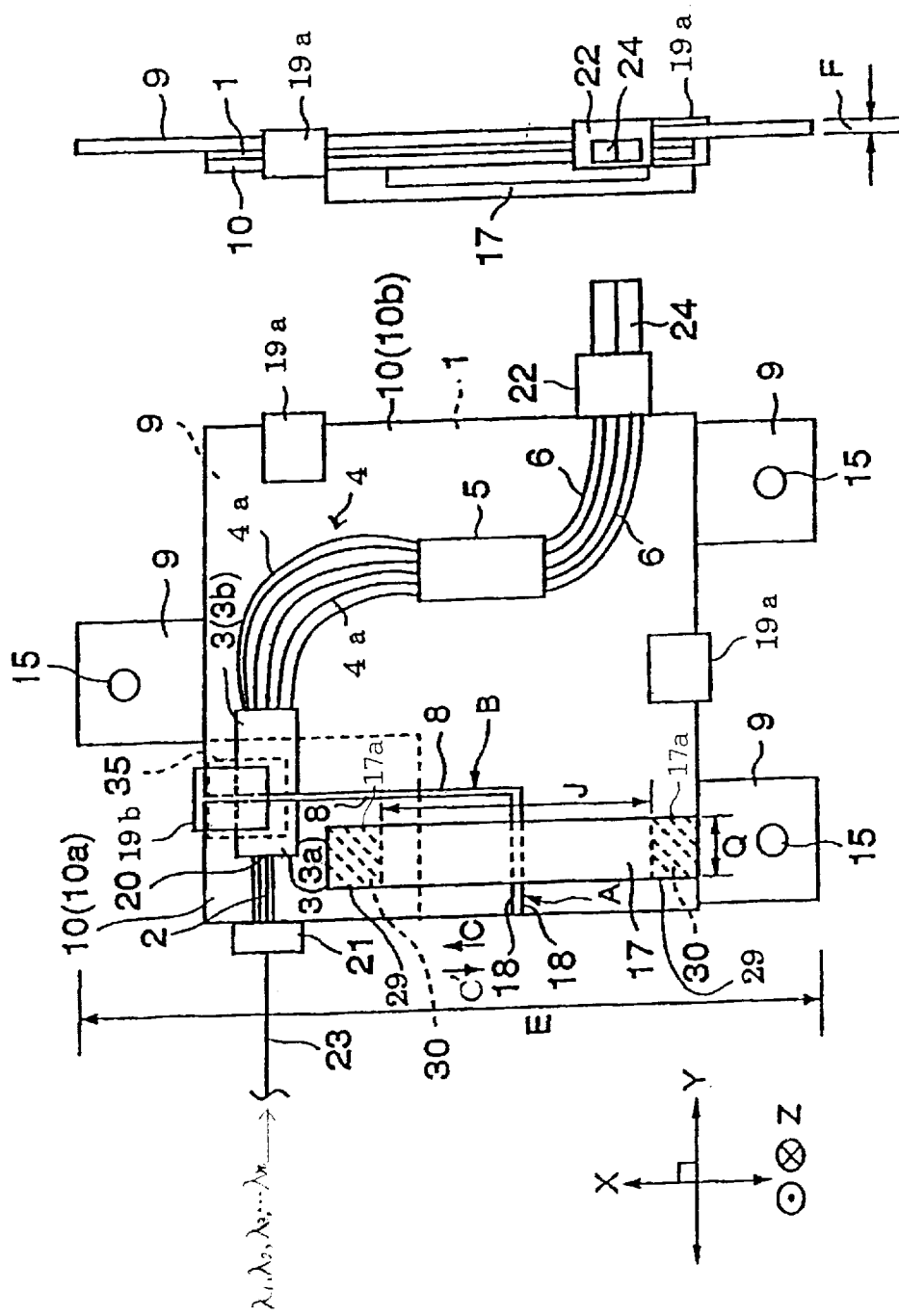
FIG. 1(a) is a top plan view showing an arrayed waveguide grating optical multiplexer/demultiplexer according to one embodiment of the present invention.

FIG. 1(a) is a plan view showing an arrayed waveguide grating optical multiplexer/demultiplexer according to one embodiment of the present invention. FIG. 1(b) is a right side view of the arrayed waveguide grating optical multiplexer/demultiplexer shown in FIG. 1(a).

Referring to FIGS. 1(a) and 1(b), the arrayed waveguide grating is manufactured by forming a waveguide forming region 10 made from silica-based glass on a substrate 1 made from silicon. The arrayed waveguide grating has at least one optical input waveguide (at least one first optical waveguide) 2 provided side by side, a first slab waveguide 3 connected to the outgoing side of the optical input waveguides 2, an arrayed waveguide 4 including a plurality of channel waveguides (4a) which are connected to the outgoing side of the first slab waveguide 3 and are provided side by side in different lengths, respectively, a second slab waveguide 5 connected to the outgoing side of the arrayed waveguide 4, and a plurality of optical output waveguides (a plurality of second optical waveguides) 6 provided side by side and connected to the outgoing side of the second slab waveguide 5. The length of adjacent channel waveguides (4a) are different from each other by a predetermined length difference (ΔL).

The optical output waveguides 6 are provided corresponding to the number of signal lights which have different wavelengths each other and which, for example, are to be multiplexed by the arrayed waveguide grating. The channel waveguides (4a) that constitute the arrayed waveguide 4 are generally disposed in multiple such as a hundred. However, in FIG. 1, the number of the channel waveguides (4a), the optical output waveguides 6 and the optical input waveguides 2 are schematically depicted to simplify the drawing.

For example, the transmitting side of optical fiber 23 is connected to the optical input waveguides 2 via an optical fiber array 21 to lead multiplexed light. The light that has been lead to the first slab waveguide 3 through one of the optical input waveguides 2 and is diffracted by the diffraction effect enters the arrayed waveguide 4.

The light that has propagated through the arrayed waveguide 4 reaches the second slab waveguide 5. Then, the lights having a different wavelength are focused at the optical output waveguides 6 to be outputted. The lengths of all of the adjacent channel waveguides (4a) of the arrayed waveguide 4 are different. Thus, a shift is generated in the phase of the respective lights having a different wavelength after propagating through the arrayed waveguide 4. According to this shifted amount, the phasefront of these lights is tilted. This tilted angle determines the positions at which the lights are focused. Therefore, the positions at which the lights having a different wavelength are focused differ from each other. On this account, the optical output waveguides 6 are formed on the position at which the lights are focused and thereby the lights having a different wavelength can be outputted from the different optical output waveguides 6 at every wavelength.

The arrayed waveguide grating has a function to demultiplex/multiplexed light which has different wavelengths and is input from the optical input waveguides 2 and to output demultiplexed lights from the optical output waveguides 6. The center wavelength of light which is to be demultiplexed is in proportion to the difference ($\Delta L$) in length of the adjacent channel waveguides (4a) and an effective refractive index ($n_c$) of the channel waveguides (4a).

The arrayed waveguide grating may be utilized as an optical component for optical wavelength division multiplexing transmission because of above described characteristics of the arrayed waveguide grating. For example, when multiplexed light having wavelengths $\lambda 1, \lambda 2, \lambda 3, \ldots$, and $\lambda n$ (n is an integer of two or greater) is inputted from one of the optical input waveguides 2, this light is diffracted at the first slab waveguide 3 to reach the arrayed waveguide 4. Then, they pass through the arrayed waveguide 4 and the second slab waveguide 5, are focused at different positions according to wavelengths and enter the optical output waveguides 6 different from each other, as set forth. Then, each of lights passes through the respective optical output waveguides 6 and is outputted from the output end of the optical output waveguides 6. An optical fiber 24 for outputting light is connected to the output end of each of the optical output waveguides 6 via an optical fiber array 22. Each of the lights having a different wavelength is output through the optical fiber 24.

The center wavelength ($\lambda_0$) of optical transmission is determined based on effective refractive index ($n_c$), the difference ($\Delta L$) in length of the adjacent channel waveguides (4a), and a diffraction order (m), and calculated by the following expression (1).

$$(\lambda_0)=(n_c)*(\Delta L)/(m) \quad (1)$$

Although the arrayed waveguide grating is utilized as a demultiplexer, the arrayed waveguide grating may also be utilized as a multiplexer. In such a case, lights are input from the second optical waveguides 6 and multiplexed light is output from one of the first optical waveguides 2. The wavelength resolution is in proportion to the difference ($\Delta L$) in length of the adjacent channel waveguides (4a). Therefore, multiplexing or demultiplexing the wavelength division multiplexing light which has narrow wavelength spacing becomes possible by increasing the difference ($\Delta L$).

When the arrayed waveguide grating is manufactured, an under-cladding film and a core film are formed on a silicon substrate by the flame hydrolysis deposition method. Then, using a photo-mask having the waveguide pattern, a core having the waveguide pattern is formed by photolithography and dry etching. Subsequently, an over-cladding film is formed over the core by using the flame hydrolysis deposition method.

The arrayed waveguide grating includes an intersecting face 8. The intersecting face 8 intersects the optical path of a light passing in the first slab waveguide 3 and divides the first slab waveguide 3 to first and second divided parts (3a and 3b) (first and second portions). The intersecting face 8 extends from an upper end portion to a middle portion of a waveguide forming region 10. Non-intersecting face 18 which does not intersect the first slab waveguide 3 extends continuously from respective ends of the intersecting face 8. In FIGS. 1(a) and 1(b), the non-intersecting face 18 extends substantially perpendicular to the intersecting face 8. However, the non-intersecting face 18 may not be perpendicular to the intersecting face 8.

Further, in this embodiment, by providing the intersecting face 8 and non-intersecting face 18, the waveguide forming region 10 is divided into a first waveguide forming region (10a) having first divided part (3a) of the first slab waveguide 3 and a second waveguide forming region (10b) having a second divided part (3b) of the first slab waveguide 3.

A slider 17 is provided such that the slider 17 connects the first and second waveguide forming regions (10a, 10b). The slider 17 has a thermal expansion coefficient which is larger than these of materials for the waveguide forming region 10 and the silicon substrate. By providing the slider 17, the first waveguide forming region (10a) slides with respect to the second waveguide forming region (10b) along the intersecting face 8 depending upon temperature.

Also, by providing on the surfaces of the first and second waveguide forming regions (10a, 10b) the slider 17 connecting the first and second waveguide forming regions (10a, 10b), the first waveguide forming region (10a) is prevented from moving upward with respect to a base 9, i.e., the Z-direction perpendicular to the X- and Y-directions as shown in FIG. 1(a), while the first waveguide forming region (10a) is sliding.

The slider 17 has leg portions (17a) and is, for example, a copper plate having the thermal expansion coefficient of $1.65 \times 10^{-5}$ (1/K). Recessed portions 30 are provided at fixing positions 29 on the top surfaces of the first and second waveguide forming regions (10a, 10b), respectively. The fixing positions 29 are shown by shading with broken lines. Each of the leg portions (17a) of the slider is fitted into each of the recessed portions 30 and fixed to each of the first and second waveguide forming regions (10a, 10b), for example, by adhesive.

The first and second waveguide forming regions (10a, 10b) are positioned such that the first and second waveguide forming regions (10a, 10b) are separated from each other by a certain distance. For example, a gap (A) in FIG. 1(a) formed at the non-intersecting face 18 may be approximately 100 μm, while a gap (B) in FIG. 1(a) formed at the intersecting face 8 may be approximately 25 μm at a room temperature, for example, 23° C.

In this embodiment, the base 9 is placed underneath a substrate 1. The base 9 has mounting portions projecting outward from the circumference of the base 9, and each mounting portion has an aperture 15 formed therein. By fitting holding devices, e.g., screws, into the apertures 15, a chip including the waveguide forming region 10 and substrate 1 is fixed onto an encasing package, i.e., a protection package for an arrayed waveguide grating. The second waveguide forming region (10b) is fixedly held onto the base 9 by using holding devices, e.g., clips (19a), at two locations.

Also, in FIG. 1(a), a silicon plate 35 is disposed in a portion of a border area over the first and second waveguide forming regions (10a, 10b). Serving as a device for preventing dislodgement, the silicon plate 35 keeps the first and second waveguide forming regions (10a, 10b) from being displaced in the direction perpendicular to the surface of the substrate 1, thereby preventing dislodgement. The silicon plate 35 is a plate having at least one flat surface, and its flat surface is directly attached to the bottom surface of the substrate 1 by means of, for example, a clip (19b). However, the silicon plate 35 and clip (19b) may be omitted.

The clip (19b) holds the silicone plate 35 such that it does not prevent the first waveguide forming region (10a) from sliding along the intersecting face 8, but allows the slider 17 to slide the first waveguide forming region (10a) along the intersecting face 8 with respect to the second waveguide region (10b).

Also, in this embodiment as shown in FIGS. 1(a) and 1(b), a length (J) between the leg portions (17a) is 20 mm, a length (E) from one end to the opposite end of the base 9 is 60 mm, a width (Q) of the slider 17 is 5 mm, and a thickness (F) of the base 9 is 1 mm.

Furthermore, the arrayed waveguide grating optical multiplexer/demultiplexer according to the first embodiment of the present invention is designed to execute optical multiplexing and optical demultiplexing of sixteen waves at an interval of 100 GHz in frequency.

Also in this embodiment, the waveguide forming region 10 has an over cladding which is doped with $B_2O_3$ and $P_2O_5$ in amounts larger than those of conventional arrayed waveguide gratings. An optical waveguide circuit chip 25 has a birefringence, B, of the core and the B is $|B| \leq 5.34 \times 10^{-5}$.

By providing such an arrayed waveguide grating optical multiplexer/demultiplexer, the polarization dependent loss is suppressed without use of a half-wave plate, thus providing a polarization independent type arrayed waveguide grating optical multiplexer/demultiplexer.

According to the present embodiment, a matching oil having a refractive index matching with that of the waveguide forming region 10 is provided in the gap formed between the first and second divided parts (3a and 3b). Furthermore, the encasing package encasing the arrayed waveguide grating of this embodiment is filled with such a matching oil. Alternatively, rather than filling the encasing package with a matching oil, a matching grease having a high viscosity may be deposited in the gap formed between the first and second divided parts (3a and 3b).

Figure 2A:
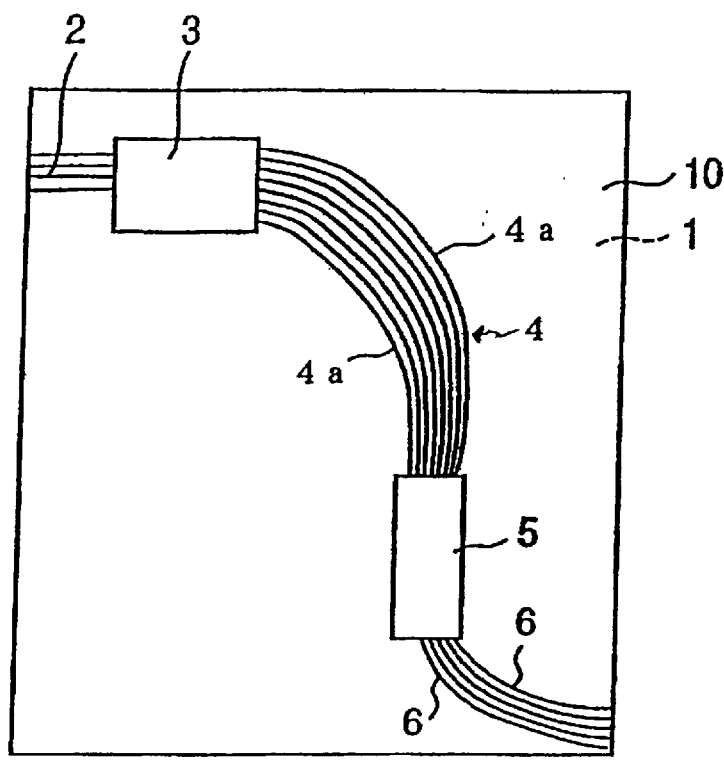
FIG. 2(a) is a top plan view illustrating one of initial steps of an exemplary method for manufacturing the arrayed waveguide grating optical multiplexer/demultiplexer shown in FIGS. 1(a) and 1(b)
Figure 2B:
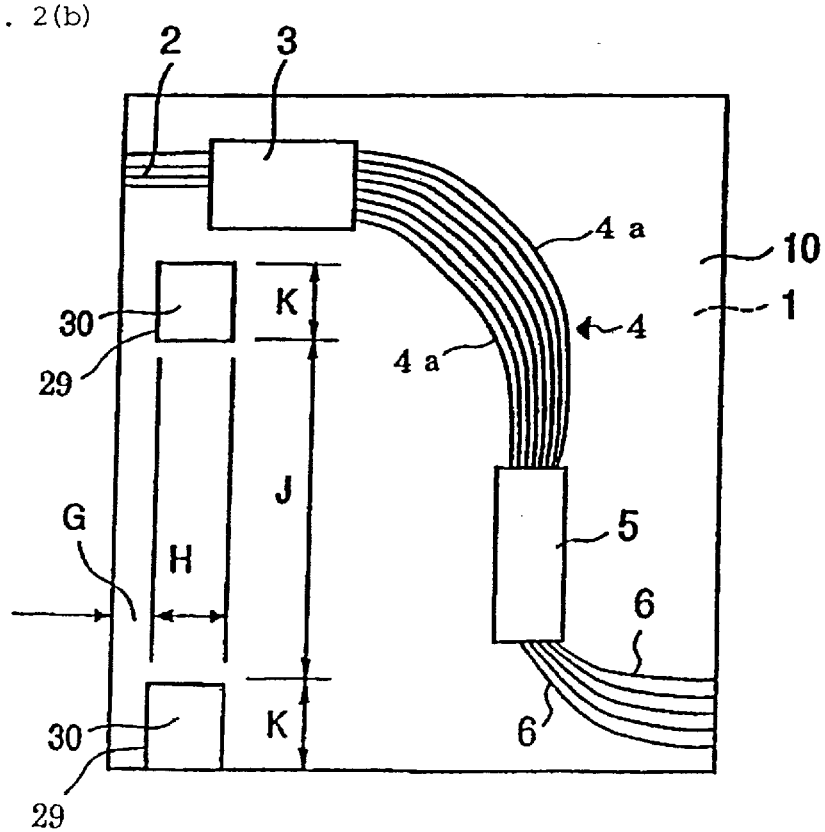
FIG. 2(b) is a top plan view illustrating another one of the initial steps of the method in FIG. 2(a)

FIGS. 2(a) and 2(b) are top plan views illustrating initial steps of an exemplary method for manufacturing the arrayed waveguide grating optical multiplexer/demultiplexer of the first embodiment according to the present invention. First, the center wavelength of optical transmission at a predetermined temperature, for example, 35° C., is measured for the arrayed waveguide grating such as one shown in FIG. 2(a). Then, deviations from the center wavelength of optical transmission at the predetermined temperature are recorded for each arrayed waveguide grating.

Referring to FIG. 2(b), the recessed portions 30 are formed in an arrayed waveguide grating by photolithograph and dry etching. The depth of the recessed portions 30 may be, for example, about 40 μm. Also, the recessed portions 30 are formed in positions where the temperature dependency of the arrayed waveguide grating can be compensated.

Figure 13:
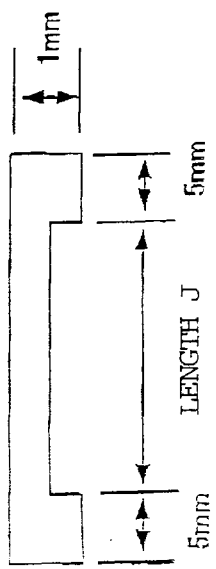
FIG. 13 is a side view illustrating a slider.

In other words, in the arrayed waveguide grating of the present embodiment, when the first divided part (3a) of the first slab waveguide moves +dx in the direction (C) as indicated by an arrow in FIG. 1(a), the center wavelength of optical transmission linearly shifts dλ toward a shorter wavelength side. Hence, the length (J) in FIGS. 1(a) and 13, i.e., the distance between the recessed portions 30, is determined such that the temperature dependency, for example, 0.011 nm/° C., of the center wavelength of optical transmission of the arrayed waveguide grating can be canceled out by an amount of thermal expansion.

In the present embodiment, a calculated length ($J_c$) of the length (J) was calculated first based on the following equation:

$$(J_c) = Dt/(Et \times R)$$

where

Et: The coefficient of thermal expansion of copper, for example, $1.65 \times 10^{-5}/°$ C.

R: The ratio of shift amount of center wavelength of optical transmission to the shift amount of the first slab waveguide, for example, 0.4 nm/10 μm Dt: Temperature dependency of the center wavelength of optical transmission, for example, 0.011 nm/° C.

In the present example, ($J_c$) is equal to 16.7 mm, approximately 17 mm. Then, an arrayed waveguide grating optical multiplexer/demultiplexer having the calculated length ($J_c$), e.g., 17 mm, for the length (J), an arrayed waveguide grating optical multiplexer/demultiplexer having the calculated length ($J_c$)+5 mm, e.g., 22 mm, for the length (J), and an arrayed waveguide grating optical multiplexer/demultiplexer having the calculated length ($J_c$)−5 mm, e.g., 12 mm, for the length (J) were prepared, and how the temperature dependency of the center wavelength of optical transmission can be characterized in the temperature range of 5° C. and 75° C. was experimented using those arrayed waveguide grating optical multiplexer/demultiplexers.

Figure 14:
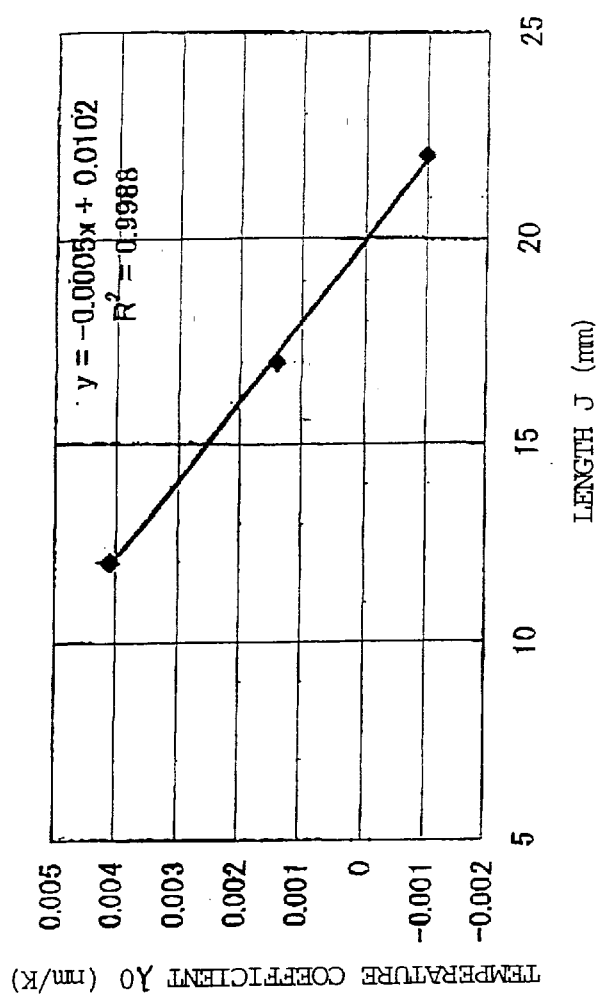
FIG. 14 illustrates a relationship between the length (J) of the slider and the temperature dependency of center wavelength of optical transmission.

The relationship between the length (J) and the temperature dependency of center wavelength of optical transmission obtained from the above experiments is shown in FIG. 14. Referring to FIG. 14, it was found that the coefficient of the temperature dependency of the center wavelength of optical transmission becomes approximately zero, when the length (J) is 20 mm. Thus, in manufacturing the arrayed waveguide grating of this embodiment, the length of the slider 17 and the positions of the recessed portions 30 were determined such that the length (J) becomes 20 mm.

Figure 3A:
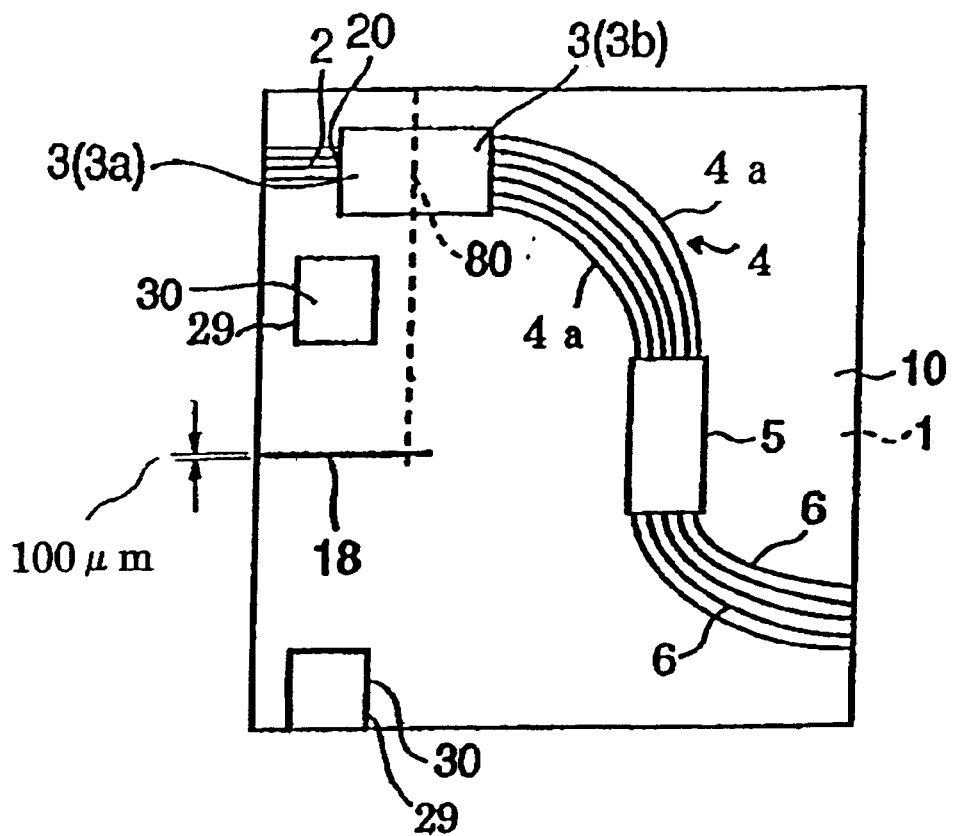
FIG. 3(a) is a top plan view illustrating a step following the initial steps shown in FIGS. 2(a) and 2(b)
Figure 3B:
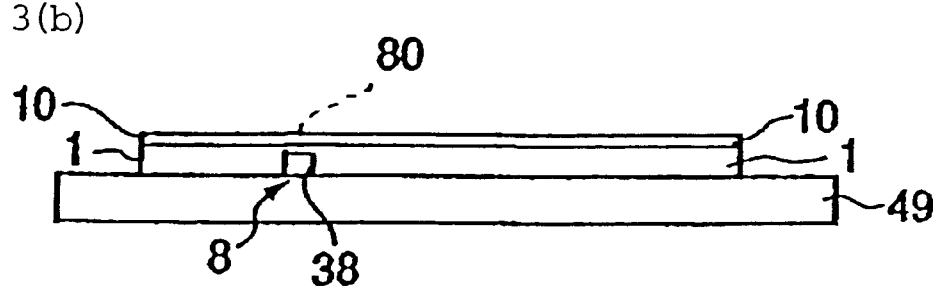
FIG. 3(b) is a side view illustrating the step illustrated in FIG. 3(a)

FIGS. 3(a) and 3(b) are top plan view and side views respectively illustrating a step following the initial steps shown in FIGS. 2(a) and 2(b). Referring to FIG. 3(a), to divide the waveguide forming region 10 into the first and second waveguide forming regions (10a, 10b), and form the intersecting face 8 and non-intersecting face 18, a dividing line 80 is determined.

The arrayed waveguide grating is cut to form the non-intersecting face 18, referring to FIG. 3(b), and a groove 38 is formed along the dividing line 80 for the intersecting face 8 in the bottom surface of the arrayed waveguide grating.

The arrayed waveguide grating is cut by a dicing saw, i.e., a dicer, to form the non-intersecting face 18, and the width of the gap formed at the non-intersecting face 18 is, for example, approximately 100 μm. The width and depth of the groove 38 are approximately 300 μm and 0.7 mm, respectively.

Figure 4A:
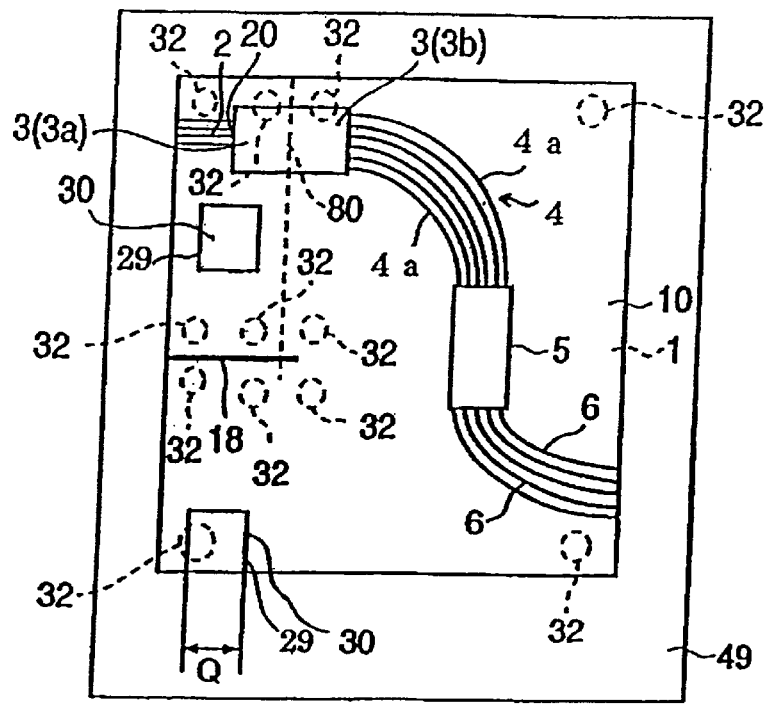
FIG. 4(a) is a top plan view illustrating one of the steps following the step illustrated in FIGS. 3(a) and 3(b)
Figure 4B:
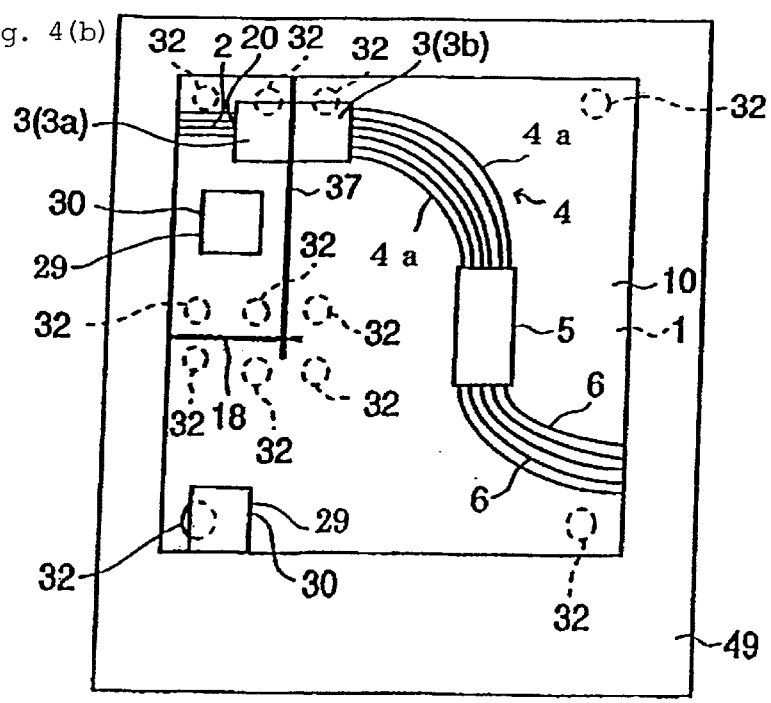
FIG. 4(b) is a top plan view illustrating another one of the steps following the step illustrated in FIGS. 3(a) and 3(b)
Figure 4C:
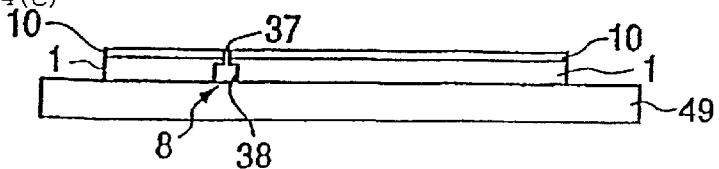
FIG. 4(c) is a side view illustrating yet another one of the steps following the step illustrated in FIGS. 3(a) and 3(b)

FIGS. 4(a), 4(b) and 4(c) are top plan views and a side view respectively illustrating steps following the step illustrated in FIGS. 3(a) and 3(b). Referring to FIG. 4(a), the arrayed waveguide grating is provisionally fixed onto a provisional fixing plate 49, e.g., a flat glass plate, at provisional fixing portions 32. To do so, an adhesive, for example, CEMEDINE High Super 5 may be deposited on the provisional fixing portions 32. The adhesive may be deposited in a several places in a round shape so as to be able separate them later.

Referring to FIGS. 4(b) and 4(c), after fixing the arrayed waveguide grating onto the provisional fixing plate 49, a groove 37 is formed along the dividing line 80 for the intersecting face 8 on the top surface of the arrayed waveguide grating. The groove 37 has approximately 20 μm in width. As seen from FIG. 4(c), the groove 37 is formed such that it is communicated to the groove 38 formed from the bottom surface of the arrayed waveguide grating, thereby forming the intersecting face 8.

Figures 5A, 5B:
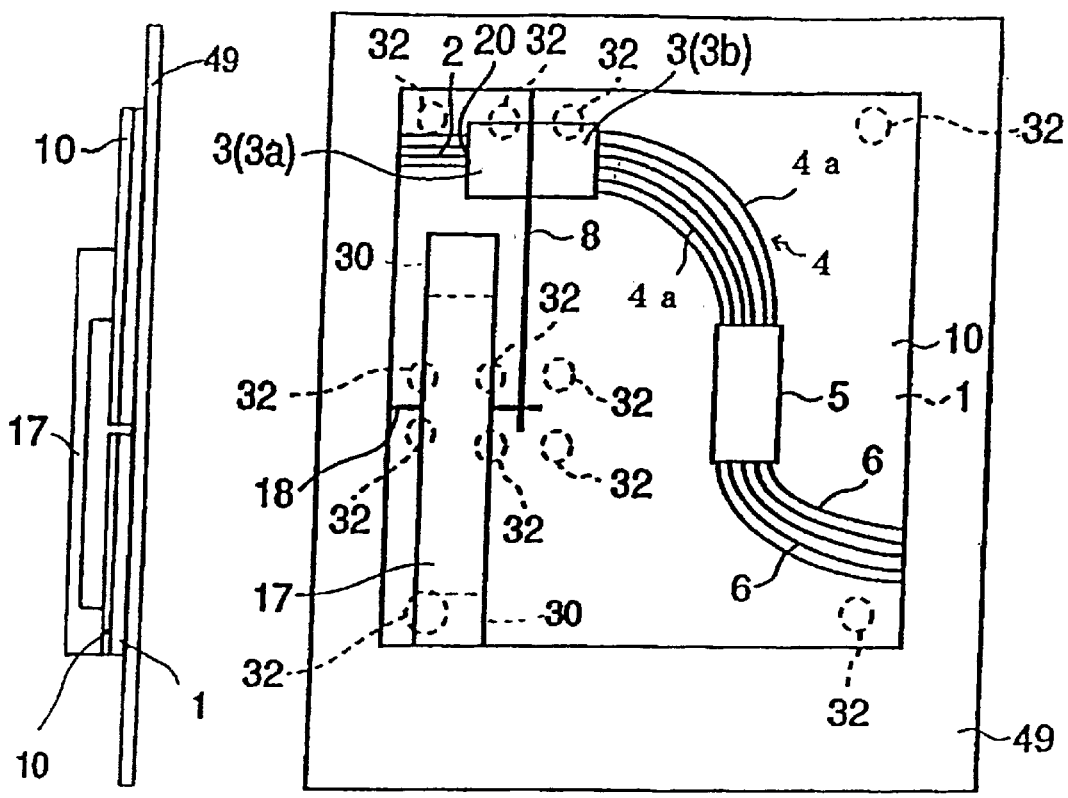
FIG. 5(a) is a side view illustrating one of the steps following the steps illustrated in FIGS. 4(a), 4(b) and 4(c)
FIG. 5(b) is a top plan view illustrating another one of the steps following the steps illustrated in FIGS. 4(a), 4(b) and 4(c)
Figure 5C:
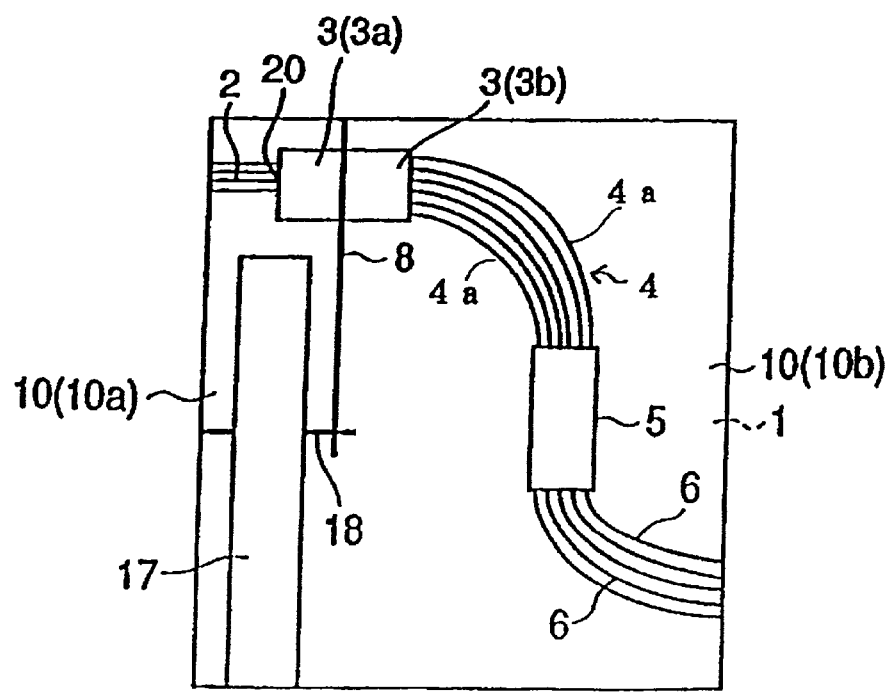
FIG. 5(c) is a top plan view illustrating another one of the steps following the steps illustrated in FIGS. 5(a) and 5(b)

FIGS. 5(a), 5(b) and 5(c) are a side view and top plan views respectively illustrating steps following the steps illustrated in FIGS. 4(a), 4(b) and 4(c). Referring to FIGS. 5(a) and 5(b), the leg portions (17a) of the slider 17 are fitted into the recessed portions 30, and fixed thereto using an adhesive, e.g., an epoxy type thermosetting adhesive, thereby fixing the slider 17 to the waveguide forming region 10.

Thus, the slider 17 is fixed in a manner that it connects the first and second waveguide forming regions (10a, 10b). This fixing process is carried out at a temperature adjusted from the predetermined temperature discussed above such that a deviation from a target wavelength of the center wavelength of optical transmission at the predetermined temperature at which the arrayed waveguide grating is supposed to be used is compensated.

In other words, when the slider 17 is being fixed as such, provided that the target center wavelength of optical transmission at the predetermined temperature, e.g., 35° C. in this embodiment, is $\lambda_d$ and that the measured center wavelength of optical transmission measured at the predetermined temperature before the waveguide forming region 10 is divided into the first and second waveguide forming regions (10a, 10b) is $\lambda_m$, an amount of temperature to be adjusted from the predetermined temperature described above would be determined from the equation, $(\lambda_d-\lambda_m)=0.011\times\Delta t$. Hence, by fixing the slider 17 onto the arrayed waveguide grating at a temperature adjusted from the predetermined temperature by Δt, the center wavelength of optical transmission can be adjusted to the target wavelength.

In the present embodiment, the center wavelength of optical transmission of the arrayed waveguide grating is measured at room temperature, and by using 0.011 nm/° C. as the temperature dependency of the center wavelength of optical transmission, the measured center wavelength, $\lambda_m$, of optical transmission is determined for the predetermined temperature of 35° C. Thus, when the center wavelength of optical transmission at the predetermined temperature deviates more than 0.05 nm on the short wavelength side for an arrayed waveguide grating, the slider 17 is fixed via the recessed portions 30 as the adhesive is hardened at a higher temperature than the predetermined temperature, e.g., 45° C. On the other hand, when the center wavelength of optical transmission at the predetermined temperature deviates more than 0.05 nm on the longer wavelength side for an arrayed waveguide grating, the slider 17 is fixed via the recessed portions 30 as the adhesive is hardened at a lower temperature than the predetermined temperature, e.g., 25° C.

Subsequently, the arrayed waveguide grating provisionally fixed onto the provisional fixing plate 49 is immersed into acetone, and as shown in FIG. 5(c), the arrayed waveguide grating is separated from the provisional fixing plate 49. As a result, the first and second waveguide forming regions (10a, 10b) are separated by the intersecting face 8 and non-intersecting face 18.

Then, referring to FIG. 1, for connecting optical fiber arrays 21, 22 to the arrayed waveguide grating, optical fibers 23, 24 of the optical fiber arrays 21, 22 are aligned with and bonded to an optical input waveguide 2 and optical output waveguides 6, respectively.

Thereafter, the waveguide forming region (10b) and the substrate 1 provided below the waveguide forming region (10b) are fixed onto the base 9 via the clips (19a). By using the clip (19b), the silicon plate 35 is attached to the lower side of the border area between the first and second waveguide forming regions (10a, 10b), i.e., the lower side of the substrate 1. The silicon plate 35 may be provided on either the upper side or lower side of the waveguide forming region 10.

After encasing the arrayed waveguide grating in an encasing package, the arrayed waveguide grating is fixed to the encasing package via the aperture 15 in the base 9. Then, the encasing package is filled with a matching oil and sealed.

In the present embodiment, by dividing the waveguide forming region 10 into the first and second waveguide forming regions (10a, 10b), and connecting the first waveguide forming region (10a) and the second waveguide forming region (10b) with the slider 17 at a temperature adjusted from the predetermined temperature discussed above such that the first waveguide forming region (10a) and the second waveguide forming region (10b) are relatively movable along the intersecting face 8 and such that a deviation from a target wavelength of the center wavelength of optical transmission at the predetermined temperature is compensated, the center wavelength of optical transmission is set to be the target wavelength at the set temperature.

Figure 6A:
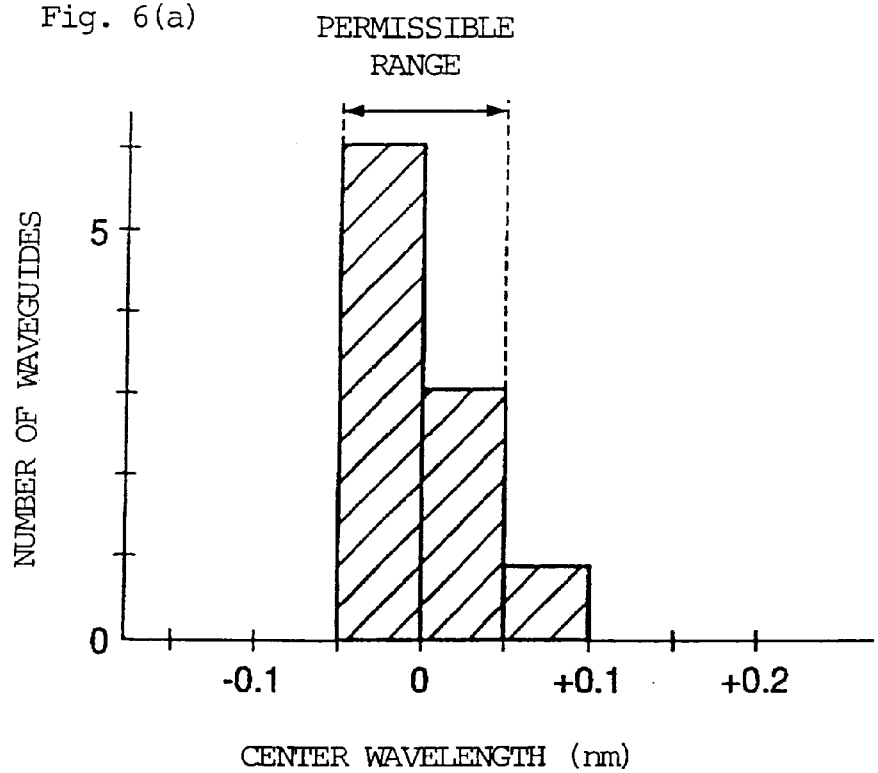
FIGS. 6(a) is a graph showing deviations of the center wavelengths of optical transmission from the target wavelength based on ten arrayed waveguide grating optical multiplexer/demultiplexers of the embodiment according to the present invention.

FIG. 6(a) is a graph showing deviations of the center wavelengths of optical transmission from the target wavelength based on ten arrayed waveguide grating optical multiplexers/demultiplexers of the present embodiment according to the present invention. Referring to FIG. 6(a), because the sliders 17 are fixed at a temperature adjusted from the predetermined temperature by Δt in a manner that deviations of the center wavelengths of optical transmission from the target wavelength are compensated, such deviations associated with various discrepancies in manufacturing arrayed waveguide gratings can be compensated at the predetermined temperature, resulting in the arrayed waveguide grating optical multiplexers/demultiplexers having smaller deviations of the center wavelength of optical transmission from the target wavelength.

Figure 6B:
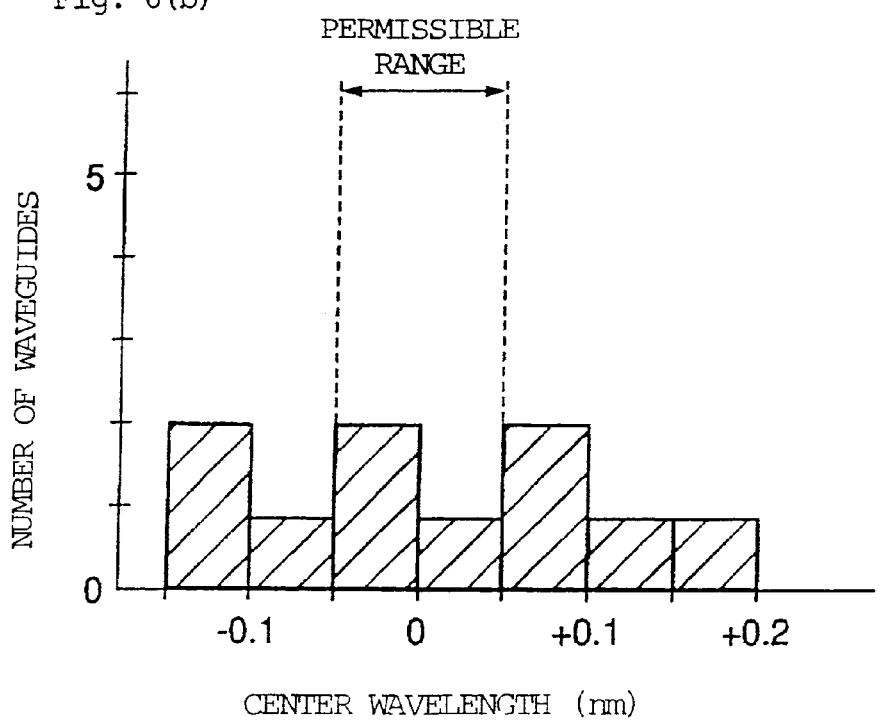
FIG. 6(b) is a graph showing deviations of the center wavelengths of optical transmission from a target wavelength based on ten arrayed waveguide grating optical multiplexer/demultiplexers prepared for comparison with the ten arrayed waveguide grating optical multiplexer/demultiplexers of FIG. 6(a)

On the other hand, FIG. 6(b) is a graph showing deviations of the center wavelengths of optical transmission from the target wavelength based on ten arrayed waveguide grating optical multiplexers/demultiplexers manufactured in accordance with the steps described in FIGS. 2s to 4s except that the sliders 17 were fixed at the predetermined temperature without any adjustments by Δt. In other words, those ten arrayed waveguide grating optical multiplexers/demultiplexers prepared for comparison were manufactured by fixing the sliders 17 to the first and second waveguide forming regions (10a, 10b) at the same predetermined temperature, instead of temperatures adjusted from the predetermined temperature, respectively.

As seen from FIG. 6(b), the majority of those arrayed waveguide grating optical multiplexers/demultiplexers prepared for comparison have the center wavelengths of optical transmission which do not agree with the target wavelength at the predetermined temperature. To contrast, FIG. 6(a) shows that those arrayed waveguide grating optical multiplexers/demultiplexers of the present embodiment according to the present invention have the center wavelengths of optical transmission which virtually agree with the target wavelength at the predetermined temperature.

Figure 16:
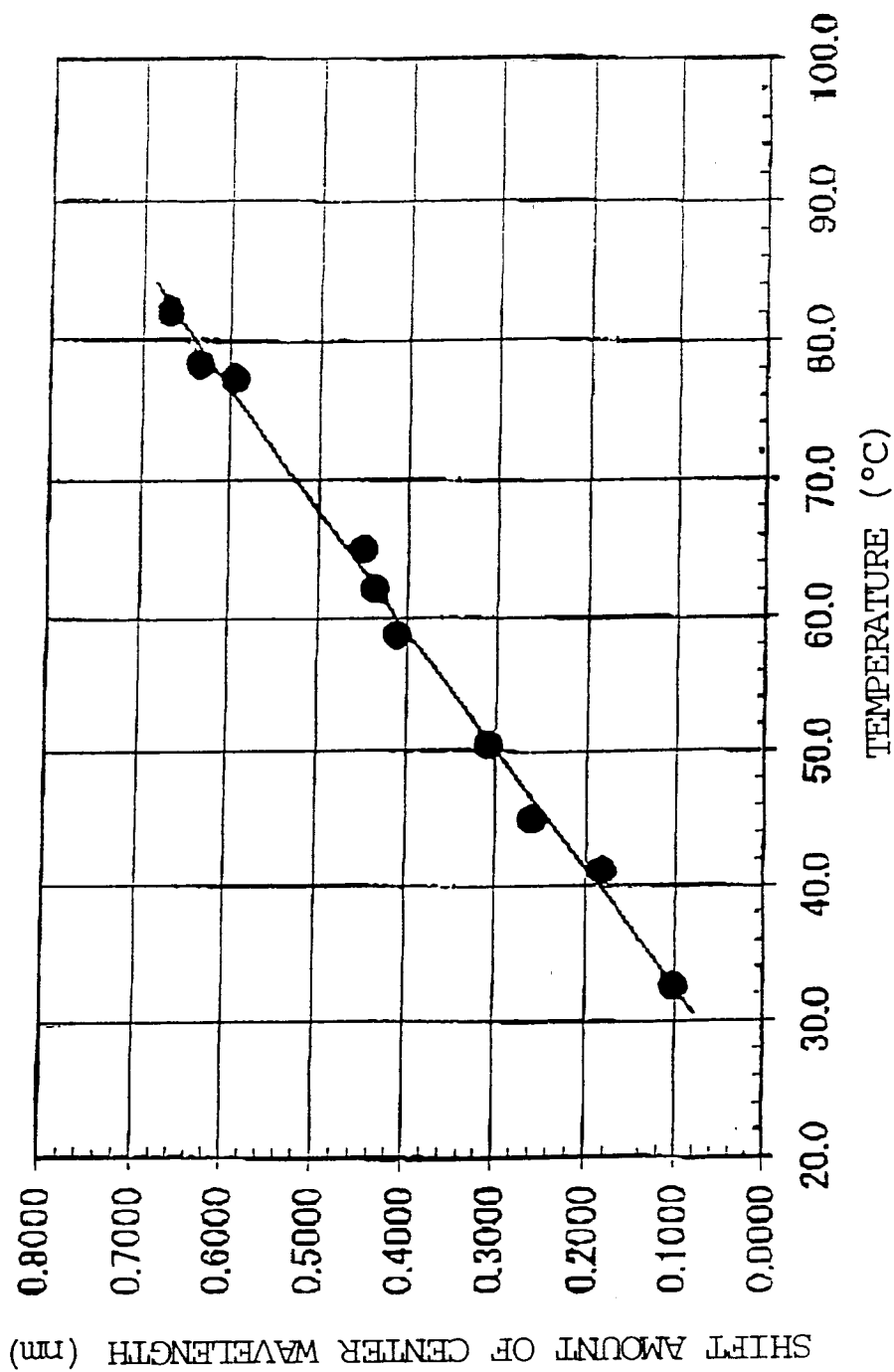

Each slider 17 may be fixed at each calculated temperature which corresponds to each shift amount of the center wavelength of optical transmission after each of center wavelengths of optical transmission of arrayed waveguide gratings has been measured. For example, referring to FIGS. 15 and 16, the slider 17 was fixed at each temperature corresponding to each shift amount of the center wavelength of optical transmission. In this case, the yield of the arrayed waveguide grating was 100%.

Also, in the present embodiment, by providing the slider 17, the first waveguide forming region (10*a*) moves along the intersecting face 8, thereby compensating the temperature dependency of the center wavelength of optical transmission for the arrayed waveguide grating. The structural simplicity of the arrayed waveguide grating of the present embodiment lowers cost of the device while improving its yield.

Furthermore, in dividing the waveguide forming region 10 into the first and second waveguide forming regions (10*a*, 10*b*), by preliminarily determining the dividing line 80, and separating the provisional fixing plate 49 after the slider 17 is fixed so as to connect the first and second waveguide forming regions (10*a*, 10*b*), the relative positions of Y-direction of the first and second waveguide forming regions (10*a*, 10*b*) before and after the separation can be maintained. When the arrayed waveguide grating is put in the room temperature, the slider 17 expands or contracts to cause the relative motion between the first and second waveguide regions (10*a*, 10*b*).

As a result, the arrayed waveguide grating can retain the same optical transmission characteristics possessed prior to the separation, and minimizes loss which could be caused by dividing the waveguide forming region 10 into the first and second waveguide forming regions (10*a*, 10*b*). When the arrayed waveguide grating is put in the room temperature, the center wavelength of the optical transmission becomes substantially equal to the target center wavelength.

Also, according to the present embodiment, by holding the second waveguide forming region (10*b*) and substrate below it via the clips (19*a*), the second waveguide forming region (10*b*) is not easily influenced by heat expansion of the base 9, and the first waveguide forming region (10*a*) slides more accurately with respect to the second waveguide forming region (10*b*), thereby canceling the effect associated with the temperature dependency of the center wavelength of optical transmission.

Still according to the present embodiment, by providing the matching oil in the gap formed at the intersecting face 8, and encasing the arrayed waveguide grating in the encasing package filled with the matching oil, the arrayed waveguide grating optical multiplexer/demultiplexer can suppress increase in loss even under high temperature and high humidity. For example, an arrayed waveguide grating which does not have good characteristics against humidity can be protected from cracking caused by absorbing moisture.

Figure 7:
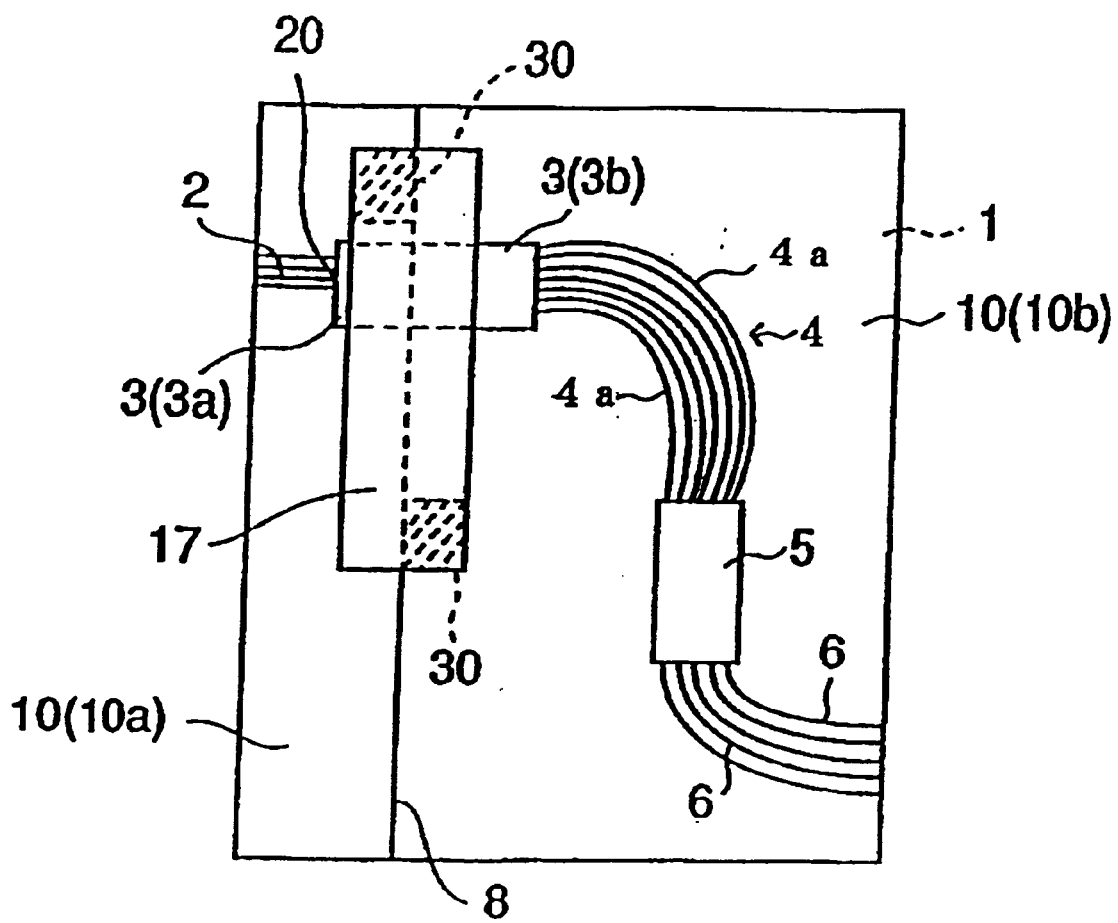
FIG. 7 is a top plan view showing an arrayed waveguide grating optical multiplexer/demultiplexer of the second embodiment according to the present invention.
Figure 8A:
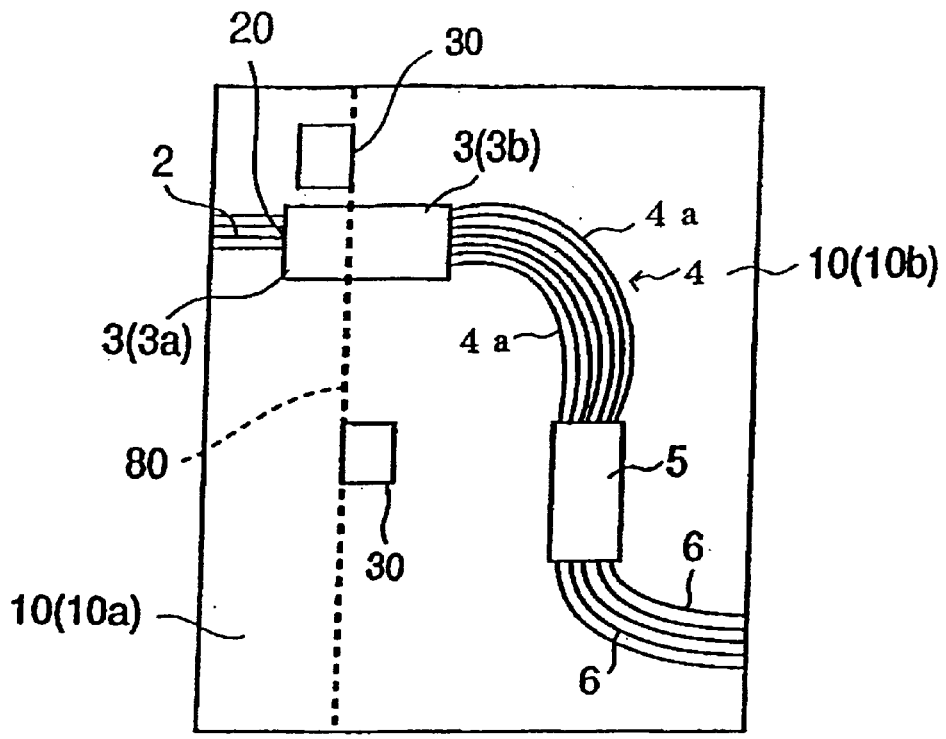
FIG. 8(a) is a top plan view illustrating a step of an exemplary method for manufacturing the arrayed waveguide grating optical multiplexer/demultiplexer of the second embodiment.
Figure 8B:
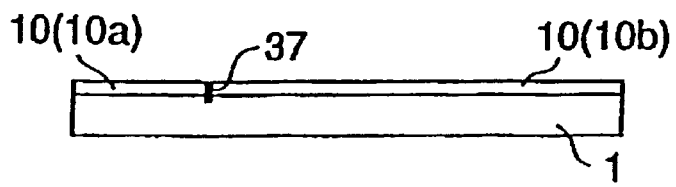
FIG. 8(b) is a side view illustrating another step of the method shown in FIG. 8(a)
Figure 8C:
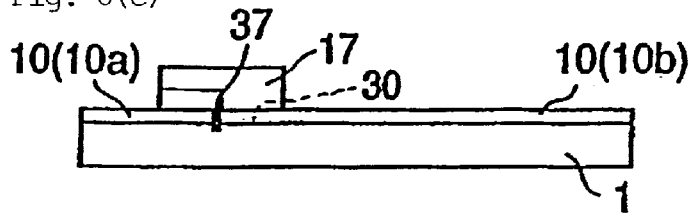
FIG. 8(c) is a side view illustrating yet another step of the method shown in FIGS. 8(a) and 8(b)
Figure 8D:
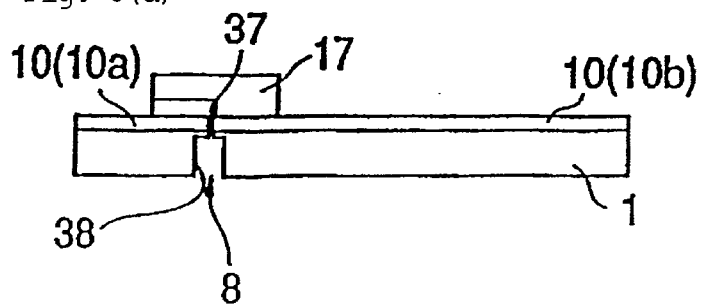
FIG. 8(d) is a side view illustrating still another step of the method shown in FIGS. 8(a), 8(b) and 8(c)

FIG. 7 is a schematic diagram showing an arrayed waveguide grating optical multiplexer/demultiplexer of the second embodiment according to the present invention. Referring to FIG. 7, the arrayed waveguide grating optical multiplexer/demultiplexer of this embodiment is divided into first and second waveguide forming regions (10*a*, 10*b*) by intersecting face 8 without forming non-intersecting face 18, and a slider 17 is provided on the top surface of a border area between the first and second waveguide forming regions (10*a*, 10*b*).

In the second embodiment, although not shown in FIG. 7, a base 9 is provided and the second waveguide forming region (10*b*) is fixed to the base 9 via clips (19*a*) similar to the first embodiment.

FIGS. 8(*a*), 8(*b*), 8(*c*) and 8(*d*) are a top plan view and side views respectively illustrating steps for manufacturing the arrayed waveguide grating optical multiplexer/demultiplexer of the second embodiment. Referring to FIG. 8(*a*), a dividing line 80 is set and recessed portions 30 are formed. Then, as seen from FIG. 8(*b*), a groove 37 is formed in the waveguide forming region 10 and a part of the silicon substrate 1. The width and depth of the groove 37 are approximately 20 $\mu$m and 0.2 mm, respectively. Subsequently, the slider 17 is fitted into the recessed portions 30 and fixed thereto as shown in FIG. 8(*c*).

When the slider 17 is being fixed, the slider 17 is fixed so as to connect the first and second waveguide forming regions (10*a*, 10*b*) at a temperature adjusted from the predetermined temperature such that a deviation of the center wavelength of optical transmission from the target wavelength at the predetermined temperature can be compensated. Thereafter, a groove 38 having approximately 300 $\mu$m in width is formed from the bottom surface of the arrayed waveguide grating.

The arrayed waveguide grating optical multiplexer/demultiplexer of the second embodiment exhibits the advantages and improvements similar to those of the first embodiment discussed above.

In the first and second embodiments, the sliders 17 utilize a copper plate. However, for the sliders 17, a metal other than copper, or besides metals, a material having a larger thermal expansion coefficient than the waveguide forming region 10 and the silicon substrate 1 may be utilized.

The sliders 17 may be provided on either the top surface of the waveguide forming region 10 or the bottom surface of the substrate 1.

Figure 9:
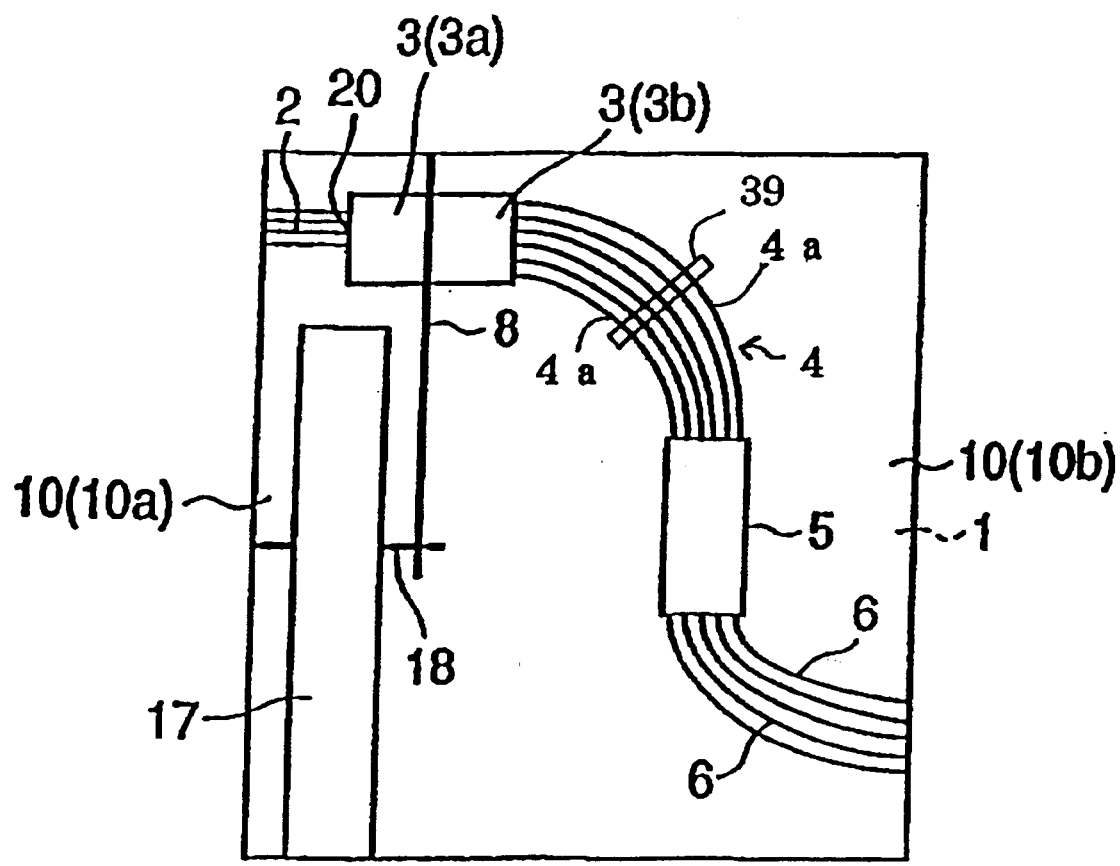
FIG. 9 is a schematic top plan view showing an arrayed waveguide grating optical multiplexer/demultiplexer of the third embodiment.

FIG. 9 is a schematic diagram showing an arrayed waveguide grating optical multiplexer/demultiplexer of the third embodiment. In the previous embodiments, the waveguide forming regions 10 have over cladding which are doped with $B_2O_3$ and $P_2O_5$ in amounts larger than those of conventional arrayed waveguide gratings, thereby making it capable of suppressing the polarization dependent loss without use of a half-wave plate. However, referring to FIG. 9, the arrayed waveguide grating optical multiplexer/demultiplexer of the third embodiment has an over cladding doped with $B_2O_3$ and $P_2O_5$ in the same amounts as those of conventional arrayed waveguide gratings but is provided with a half-wave plate 39 across an arrayed waveguide 4. By doing so, a groove for inserting the half-wave plate 39 is formed across the arrayed waveguide 4, and the half-wave plate 39 is inserted in this groove.

Furthermore, rather than dividing the first slab waveguide 3 as in the previous embodiments, the second slab waveguide may be divided and at least one of the divided slab waveguides may be made capable of sliding along the intersecting face 8 in the direction which results in reducing the deviation of the center wavelength of optical transmission due to its temperature dependency. In doing so, the advantages and improvements similar to those of the previous embodiments can be obtained and the deviation of the center wavelength of optical transmission associated with its temperature dependency can be canceled.

Still alternatively, rather than making the intersecting face 8 of the first and second slab waveguides 3, 5 parallel to the X-axis or Y-axis respectively as described in the previous embodiments, the intersecting face 8 may be angled with respect to the X-axis or Y-axis as long as they intersect the optical paths of a slab waveguide to be divided.

In yet another alternative, rather than providing the multiple optical input waveguides 2 as shown in the embodiments, only one optical input waveguide may be used.

In still another alternative, rather than holding the second waveguide forming region (10b) to the base 9 via the clips (19a), the second waveguide forming region (10b) may be held onto the base 9 via holding devices other than the clips (19a). Further, the first waveguide forming region (10a) may be fixed to the base 9 by its perimeter portion and the second waveguide forming region (10b) is slidable along the intersecting face 8 with respect to the first waveguide forming region (10a).

Figure 10A:
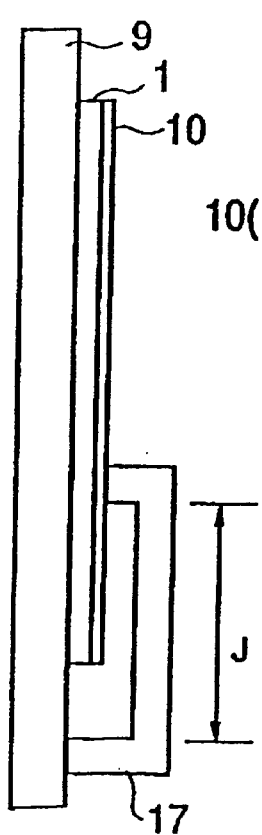
FIG. 10(a) is a side view illustrating an arrayed waveguide grating optical multiplexer/demultiplexer of the fourth embodiment.
Figure 10B:
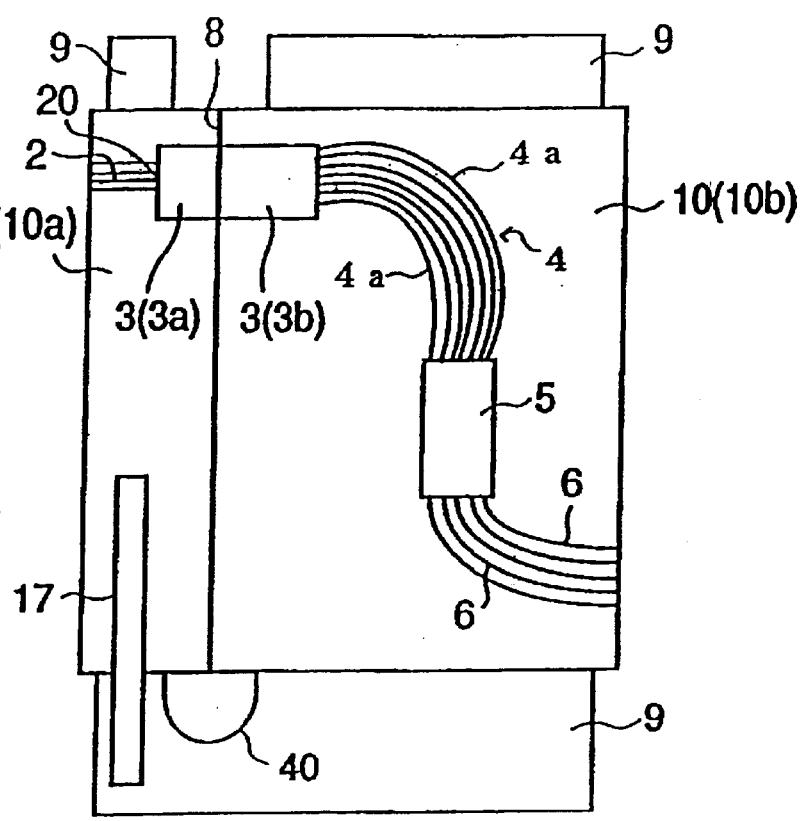
FIG. 10(b) is a top plan view illustrating the arrayed waveguide grating optical multiplexer/demultiplexer shown in FIG. 10(a)
Figure 12:
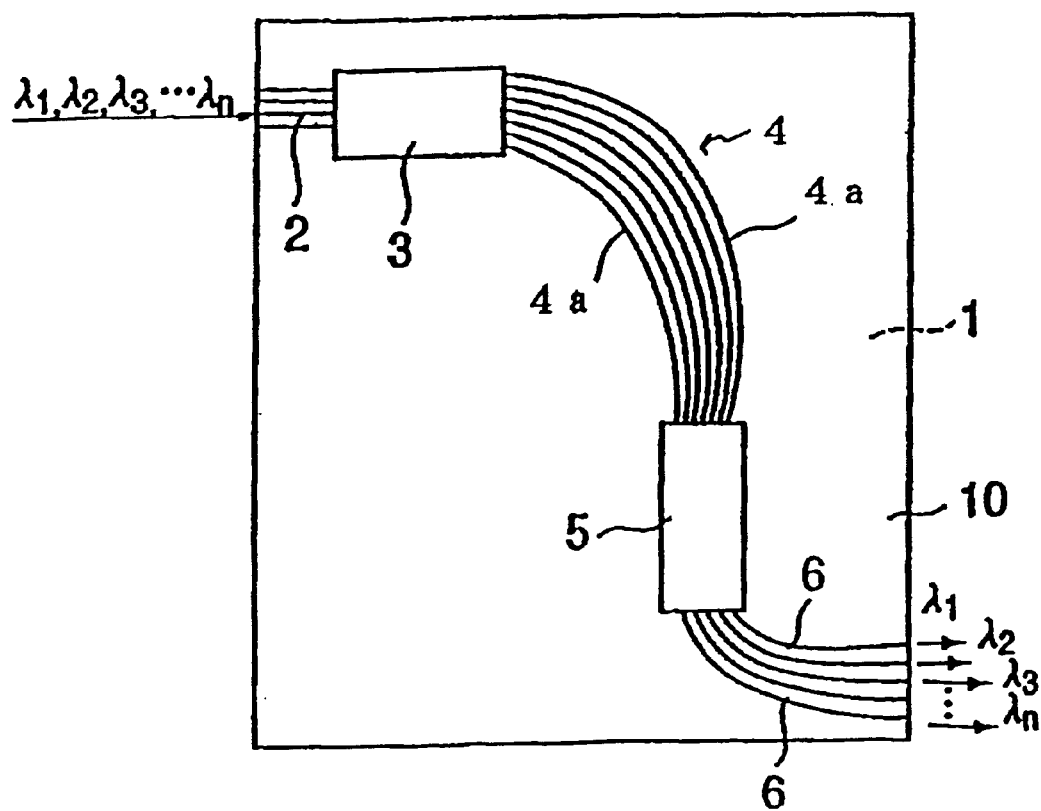
FIG. 12 is a top plan view of an arrayed waveguide grating optical multiplexer/demultiplexer of a background art.

FIGS. 10(a) and 10(b) are a side view and a top plan view respectively illustrating an arrayed waveguide grating optical multiplexer/demultiplexer of the fourth embodiment. Referring to FIGS. 10(a) and 10(b), a slider 17 is fixed so as to connect a base 9 and one of first and second waveguide forming regions (10a, 10b), instead of the first and second waveguide forming regions (10a, 10b) shown in the aforementioned embodiments.

In this embodiment, after providing an arrayed waveguide grating on the base 9, the slider 17 is fixed so as to connect the base 9 and one of the first and second waveguide forming regions (10a, 10b) at a temperature adjusted from the predetermined temperature such that the deviation of the center wavelength of optical transmission from the target wavelength at the predetermined temperature can be compensated. As a result, the arrayed waveguide grating optical multiplexer/demultiplexer of the fourth embodiment can match the center wavelength of optical transmission with the target wavelength as in the arrayed waveguide grating optical multiplexer/demultiplexers of the previous embodiments.

FIGS. 11(a), 11(b) and 11(c) are top plan views and a side view respectively illustrating steps of manufacturing the arrayed waveguide grating optical multiplexer/demultiplexer shown in FIGS. 10(a) and 10(b).

Referring to FIG.(a), an arrayed waveguide grating is provided on the base 9 made of, for example, a U-shaped quartz plate, a dividing line 80 is preliminarily set, and only the second waveguide forming region (10b) is fixed onto the base 9 using, for example, a thermosetting adhesive. Then, after fixing the slider 17 so as to connect the base 9 and the first waveguide forming region (10a), the waveguide forming region 10 is physically divided along the dividing line 80 into the first and second waveguide forming regions (10a, 10b) as shown in FIGS. 11(b) and 11(c).

In the aforementioned embodiments, the waveguide forming region 1 is divided to first and second waveguide forming regions (10a and 10b) by cutting. However, the waveguide forming region 10 may be divided to first and second waveguide forming regions (10a and 10b) by other methods, for example, cleaving.

Although the slider 17 is fixed to the recessed portions in the above described embodiments, the slider 17 may be fixed using a jig without forming the recessed portions.

In the above embodiments, although the arrayed waveguide grating is utilized as a demultiplexer, the arrayed waveguide grating may also be utilized as a multiplexer. In such a case, lights are input from the second optical waveguides 6 and a light having a plurality of wavelength is output from one of the first optical waveguides 2.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An arrayed waveguide grating optical multiplexer/demultiplexer comprising:
   at least one first optical waveguide;
   a first slab waveguide including first and second portions which are divided along an intersecting face intersecting an optical path in the first slab waveguide;
   an arrayed waveguide connected to said at least one first optical waveguide via said first slab waveguide;
   a second slab waveguide;
   a plurality of second optical waveguides connected to said arrayed waveguide via said second slab waveguide; and
   a slider fixed at a temperature shifted from a predetermined temperature to compensate a center wavelength difference between a target center wavelength of optical transmission of the arrayed waveguide grating optical multiplexer/demultiplexer at the predetermined temperature and the measured center wavelength of optical transmission of the arrayed waveguide grating optical multiplexer/demultiplexer at the predetermined temperature before the first slab waveguide is divided to the first and second portions, the slider being configured to cause a relative motion between the first and second portions of the first slab waveguide along the intersecting face according to a temperature change.

2. An arrayed waveguide grating optical multiplexer/demultiplexer according to claim 1, wherein the at least one first optical waveguide, the first slab waveguide, the arrayed waveguide, the second slab waveguide, and the plurality of second optical waveguides are formed in a waveguide forming region, and wherein the slider has a thermal expansion coefficient higher than that of the waveguide forming region.

3. An arrayed waveguide grating optical multiplexer/demultiplexer according to claim 1, wherein the intersecting face substantially vertically intersects the optical path.

4. An arrayed waveguide grating optical multiplexer/demultiplexer according to claim 1, wherein the at least one first optical waveguide, the first slab waveguide, the arrayed waveguide, the second slab waveguide, and the plurality of second optical waveguides are formed in a waveguide forming region, and wherein dopant is doped in the waveguide forming region such that an absolute value of a birefringence of core of the waveguide forming region is at most $5.34 \times 10^{-5}$.

5. An arrayed waveguide grating optical multiplexer/demultiplexer according to claim 4, wherein the dopant comprises $B_2O_3$ and $P_2O_5$.

6. An arrayed waveguide grating optical multiplexer/demultiplexer according to claim 1, further comprising:
   matching oil provided in a gap formed between the first and second portions and having a refractive index which matches with that of a waveguide forming region in which the at least one first optical waveguide, the first slab waveguide, the arrayed waveguide, the second slab waveguide, and the plurality of second optical waveguides are formed.

7. An arrayed waveguide grating optical multiplexer/demultiplexer according to claim 1, wherein the slider has a length between fixed parts which are fixed to the first and second portions to compensate a temperature dependency of a center wavelength of the arrayed waveguide grating optical multiplexer/demultiplexer.

8. An arrayed waveguide grating optical multiplexer/demultiplexer according to claim 1, wherein the temperature is shifted from the predetermined temperature by substantially a shifting temperature ($\Delta t$) which is calculated according to the following equation:

$$\Delta t = (\lambda_d - \lambda_m)/0.011$$

where $\lambda_d$: the target center wavelength of optical transmission at the predetermined temperature $\lambda_m$: the measured center wavelength of optical transmission of the arrayed waveguide grating optical multiplexer/demultiplexer at the predetermined temperature before the first slab waveguide is divided into the first and second portions.

9. An arrayed waveguide grating optical multiplexer/demultiplexer according to claim 1, further comprising:

a half-wave plate provided across the array waveguide.

10. An arrayed waveguide grating optical multiplexer/demultiplexer according to claim 1, wherein the intersecting face obliquely intersects the optical path.

11. An arrayed waveguide grating optical multiplexer/demultiplexer according to claim 1, further comprising:

at least one clip; and a base to which one of the first and second portions of the first slab waveguide is fixed with the at least one clip.

12. An arrayed waveguide grating optical multiplexer/demultiplexer according to claim 1, wherein the at least one first optical waveguide, the first slab waveguide, the arrayed waveguide, the second slab waveguide, and the plurality of second optical waveguides are formed in a waveguide forming region, the waveguide forming region is divided to first and second waveguide forming regions to divide the first slab waveguide to the first and second portions, and the slider is fixed to the first and second waveguide forming regions to connect the first and second waveguide forming regions at the temperature shifted from the predetermined temperature.

13. An arrayed waveguide grating optical multiplexer/demultiplexer according to claim 1, wherein the at least one first optical waveguide, the first slab waveguide, the arrayed waveguide, the second slab waveguide, and the plurality of second optical waveguides are formed in a waveguide forming region, the waveguide forming region is divided to first and second waveguide forming regions to divide the first slab waveguide to the first and second portions, one of the first and second waveguide forming regions is fixed to a base, and the slider is fixed to the base and another of the first and second waveguide forming regions to connect the base and the another of the first and second waveguide forming regions at the temperature shifted from the predetermined temperature.

14. An arrayed waveguide grating optical multiplexer/demultiplexer according to claim 13, wherein the base has a U-Shape.

15. An arrayed waveguide grating optical multiplexer/demultiplexer according to claim 12, wherein the waveguide forming region is divided to first and second waveguide forming regions along the intersecting face and a non-intersecting face which does not intersect the optical path, and wherein the slider is fixed to the first and second waveguide forming regions across the non-intersecting face.

16. An arrayed waveguide grating optical multiplexer/demultiplexer according to claim 12, wherein the slider is fixed to the first and second waveguide forming regions such that a longitudinal direction of the slider is substantially parallel to the intersecting face.

17. A method for manufacturing an arrayed waveguide grating optical multiplexer/demultiplexer, the method comprising:

providing an arrayed waveguide grating including at least one first optical waveguide, a first slab waveguide, an arrayed waveguide connected to said at least one first optical waveguide via said first slab waveguide, a second slab waveguide, and a plurality of second optical waveguides connected to said arrayed waveguide via said second slab waveguide;

measuring a measured center wavelength of optical transmission of the arrayed waveguide grating at a predetermined temperature;

finding a center wavelength difference between a target center wavelength of optical transmission of the arrayed waveguide grating at the predetermined temperature and the measured center wavelength;

dividing at least one of the first and second slab waveguides to first and second portions along an intersecting face intersecting an optical path in the at least one of the first and second slab waveguides; and fixing a slider at a temperature shifted from the predetermined temperature to compensate the center wavelength difference such that the slider causes a relative motion between the first and second portions along the intersecting face according to a temperature change.

18. A method according to claim 17, wherein the at least one first optical waveguide, the first slab waveguide, the arrayed waveguide, the second slab waveguide, and the plurality of second optical waveguides are formed in a waveguide forming region, and wherein the slider has a thermal expansion coefficient higher than that of the waveguide forming region.

19. A method according to claim 17, wherein the intersecting face substantially vertically intersects the optical path.

20. A method according to claim 17, wherein the at least one first optical waveguide, the first slab waveguide, the arrayed waveguide, the second slab waveguide, and the plurality of second optical waveguides are formed in a waveguide forming region, and wherein dopant is doped in the waveguide forming region such that an absolute value of a birefringence of core of the waveguide forming region is at most $5.34 \times 10^{-5}$.

21. A method according to claim 20, wherein the dopant comprises $B_2O_3$ and $P_2O_5$.

22. A method according to claim 17, further comprising:

providing matching oil in a gap formed between the first and second portions, the matching oil having a refractive index which matches with that of a waveguide forming region in which the at least one first optical waveguide, the first slab waveguide, the arrayed waveguide, the second slab waveguide, and the plurality of second optical waveguides are formed.

23. A method according to claim 17, wherein a length of the slider between fixed parts which are fixed to the first and second portions are determined to compensate a temperature dependency of a center wavelength of the arrayed waveguide grating.

24. A method according to claim 17, wherein the temperature is shifted from the predetermined temperature by substantially a shifting temperature (Δt) which is calculated according to the following equation:

$$\Delta t = (\lambda_d - \lambda_m)/0.011$$

where
- $\lambda_d$: the target center wavelength of optical transmission at the predetermined temperature
- $\lambda_m$: the measured center wavelength of optical transmission of the arrayed waveguide grating optical multiplexer/demultiplexer at the predetermined temperature before the first slab waveguide is divided into the first and second portions.

25. A method according to claim 17, further comprising: providing a half-wave plate across the array waveguide.

26. A method according to claim 17, wherein the intersecting face is provided to obliquely intersect the optical path.

27. A method according to claim 17, further comprising: fixing one of the first and second portions to a base with at least one clip.

28. A method according to claim 17, wherein
the at least one first optical waveguide, the first slab waveguide, the arrayed waveguide, the second slab waveguide, and the plurality of second optical waveguides are formed in a waveguide forming region,
the waveguide forming region is divided to first and second waveguide forming regions to divide the at least one of the first and second slab waveguides to the first and second portions, and
the slider is fixed to the first and second waveguide forming regions to connect the first and second waveguide forming regions at the temperature shifted from the predetermined temperature.

29. A method according to claim 17, wherein
the at least one first optical waveguide, the first slab waveguide, the arrayed waveguide, the second slab waveguide, and the plurality of second optical waveguides are formed in a waveguide forming region,
the waveguide forming region is divided to first and second waveguide forming regions to divide the at least one of the first and second slab waveguides to the first and second portions,
one of the first and second waveguide forming regions is fixed to a base, and
the slider is fixed to the base and another of the first and second waveguide forming regions to connect the base and the another of the first and second waveguide forming regions at the temperature shifted from the predetermined temperature.

30. A method according to claim 29, further comprising: forming the base in a U-Shape.

31. A method according to claim 28, wherein the waveguide forming region is divided to first and second waveguide forming regions along the intersecting face and a non-intersecting face which does not intersect the optical path, and wherein the slider is fixed to the first and second waveguide forming regions across the non-intersecting face.

32. A method according to claim 28, wherein the slider is fixed to the first and second waveguide forming regions such that a longitudinal direction of the slider is substantially parallel to the intersecting face.

33. A method according to claim 17, further comprising:
cutting the arrayed waveguide grating along a non-intersecting face which does not intersect the optical path;
forming a bottom groove along the intersecting face on a bottom surface of the arrayed waveguide grating;
provisionally fixing the arrayed waveguide grating on a provisional fixing plate;
forming a top groove along the intersecting face on a top surface of the arrayed waveguide grating to cut the arrayed waveguide grating to first and second arrayed waveguide grating portions to divide the at least one of the first and second slab waveguides to the first and second portions;
fixing a slider to the first and second arrayed waveguide grating portions to connect the first and second waveguide forming regions at the temperature shifted from the predetermined temperature; and
removing the provisional fixing plate from the arrayed waveguide grating.

34. A method according to claim 17, further comprising:
forming a top groove along the intersecting face on a top surface of the arrayed waveguide grating, the top groove dividing the arrayed waveguide grating to first and second arrayed waveguide grating portions to divide the at least one of the first and second slab waveguides to the first and second portions;
fixing a slider to the first and second arrayed waveguide grating portions at the temperature shifted from the predetermined temperature; and
forming a bottom groove along the intersecting face on a bottom surface of the arrayed waveguide grating to cut the arrayed waveguide grating to first and second arrayed waveguide grating portions to divide the at least one of the first and second slab waveguides to the first and second portions.

35. An arrayed waveguide grating optical multiplexer/demultiplexer comprising:
at least one first optical waveguide;
a first slab waveguide;
an arrayed waveguide connected to said at least one first optical waveguide via said first slab waveguide;
a second slab waveguide including first and second portions which are separated along an intersecting face intersecting an optical path in the second slab waveguide;
a plurality of second optical waveguides connected to said arrayed waveguide via said second slab waveguide; and
a slider fixed at a temperature shifted from a predetermined temperature to compensate a center wavelength difference between a target center wavelength of optical transmission of the arrayed waveguide grating optical multiplexer/demultiplexer at the predetermined temperature and the measured center wavelength of optical transmission of the arrayed waveguide grating optical multiplexer/demultiplexer at the predetermined temperature before the second slab waveguide is divided into the first and second portions, the slider being configured to cause a relative motion between the first and second portions of the second slab waveguide along the intersecting face according to a temperature change.

36. An arrayed waveguide grating optical multiplexer/demultiplexer according to claim 35, wherein the at least one first optical waveguide, the first slab waveguide, the arrayed waveguide, the second slab waveguide, and the plurality of second optical waveguides are formed in a waveguide forming region, and wherein the slider has a thermal expansion coefficient higher than that of the waveguide forming region.

37. An arrayed waveguide grating optical multiplexer/demultiplexer according to claim 35, wherein the intersecting face substantially vertically intersects the optical path.

38. An arrayed waveguide grating optical multiplexer/demultiplexer according to claim 35, wherein the at least one first optical waveguide, the first slab waveguide, the arrayed waveguide, the second slab waveguide, and the plurality of second optical waveguides are formed in a waveguide forming region, and wherein dopant is doped in the waveguide forming region such that an absolute value of a birefringence of core of the waveguide forming region is at most $5.34 \times 10^{-5}$.

39. An arrayed waveguide grating optical multiplexer/demultiplexer according to claim 38, wherein the dopant comprises $B_2O_3$ and $P_2O_5$.

40. An arrayed waveguide grating optical multiplexer/demultiplexer according to claim 35, further comprising:
    matching oil provided in a gap formed between the first and second portions and having a refractive index which matches with that of a waveguide forming region in which the at least one first optical waveguide, the first slab waveguide, the arrayed waveguide, the second slab waveguide, and the plurality of second optical waveguides are formed.

41. An arrayed waveguide grating optical multiplexer/demultiplexer according to claim 35, wherein the slider has a length between fixed parts which are fixed to the first and second portions to compensate a temperature dependency of a center wavelength of the arrayed waveguide grating optical multiplexer/demultiplexer.

42. An arrayed waveguide grating optical multiplexer/demultiplexer according to claim 35, wherein the temperature is shifted from the predetermined temperature by substantially a shifting temperature ($\Delta t$) which is calculated according to the following equation:

$$\Delta t = (\lambda_d - \lambda_m)/0.011$$

where
    $\lambda_d$: the target center wavelength of optical transmission at the predetermined temperature
    $\lambda_m$: the measured center wavelength of optical transmission of the arrayed waveguide grating optical multiplexer/demultiplexer at the predetermined temperature before the first slab waveguide is divided into the first and second portions.

43. An arrayed waveguide grating optical multiplexer/demultiplexer according to claim 35, further comprising:
    a half-wave plate provided across the array waveguide.

44. An arrayed waveguide grating optical multiplexer/demultiplexer according to claim 35, wherein the intersecting face obliquely intersects the optical path.

45. An arrayed waveguide grating optical multiplexer/demultiplexer according to claim 35, further comprising:
    at least one clip; and
    a base to which one of the first and second portions of the second slab waveguide is fixed with the at least one clip.

46. An arrayed waveguide grating optical multiplexer/demultiplexer according to claim 35, wherein
    the at least one first optical waveguide, the first slab waveguide, the arrayed waveguide, the second slab waveguide, and the plurality of second optical waveguides are formed in a waveguide forming region,
    the waveguide forming region is divided to first and second waveguide forming regions to divide the second slab waveguide to the first and second portions, and
    the slider is fixed to the first and second waveguide forming regions to connect the first and second waveguide forming regions at the temperature shifted from the predetermined temperature.

47. An arrayed waveguide grating optical multiplexer/demultiplexer according to claim 35, wherein
    the at least one first optical waveguide, the first slab waveguide, the arrayed waveguide, the second slab waveguide, and the plurality of second optical waveguides are formed in a waveguide forming region,
    the waveguide forming region is divided to first and second waveguide forming regions to divide the second slab waveguide to the first and second portions,
    one of the first and second waveguide forming regions is fixed to a base, and
    the slider is fixed to the base and another of the first and second waveguide forming regions to connect the base and the another of the first and second waveguide forming regions at the temperature shifted from the predetermined temperature.

48. An arrayed waveguide grating optical multiplexer/demultiplexer according to claim 47, wherein the base has a U-Shape.

49. An arrayed waveguide grating optical multiplexer/demultiplexer according to claim 46, wherein the waveguide forming region is divided to first and second waveguide forming regions along the intersecting face and a non-intersecting face which does not intersect the optical path, and wherein the slider is fixed to the first and second waveguide forming regions across the non-intersecting face.

50. An arrayed waveguide grating optical multiplexer/demultiplexer according to claim 46, wherein the slider is fixed to the first and second waveguide forming regions such that a longitudinal direction of the slider is substantially parallel to the intersecting face.

* * * * *

UNITED STATES PATENT AND TRADEMARK OFFICE
CERTIFICATE OF CORRECTION

| | | |
|---|---|---|
| PATENT NO. | : 6,735,364 B2 | Page 1 of 1 |
| APPLICATION NO. | : 10/159101 | |
| DATED | : May 11, 2004 | |
| INVENTOR(S) | : Kashihara et al. | |

It is certified that error appears in the above-identified patent and that said Letters Patent is hereby corrected as shown below:

On the title page, Item (30), the second Foreign Application Priority Data has been omitted. Item (30) should read:

-- (30)     Foreign Application Priority Data

Aug. 27, 2001   (JP) ...........................2001-256343
    Jan. 24, 2002   (JP) ...........................2002-015326 --

Signed and Sealed this

Twenty-second Day of August, 2006

JON W. DUDAS
*Director of the United States Patent and Trademark Office*